(12) United States Patent
Liu et al.

(10) Patent No.: US 10,542,121 B2
(45) Date of Patent: Jan. 21, 2020

(54) DYNAMIC CONFIGURATION OF MULTI-PLATFORM APPLICATIONS

(71) Applicant: eBay Inc., San Jose, CA (US)

(72) Inventors: Allen Yihren Liu, San Francisco, CA (US); Philip J. King, San Mateo, CA (US); Ajay K. Agrawal, Cupertino, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 15/676,204

(22) Filed: Aug. 14, 2017

(65) Prior Publication Data

US 2018/0013859 A1     Jan. 11, 2018

Related U.S. Application Data

(63) Continuation of application No. 14/165,359, filed on Jan. 27, 2014, now Pat. No. 9,736,269, which is a continuation of application No. 11/508,420, filed on Aug. 23, 2006, now Pat. No. 8,639,782.

(51) Int. Cl.
    *H04L 29/08*        (2006.01)
    *G06F 9/445*        (2018.01)

(52) U.S. Cl.
    CPC .......... *H04L 67/34* (2013.01); *G06F 9/44505* (2013.01); *H04L 67/025* (2013.01)

(58) Field of Classification Search
None
See application file for complete search history.

(56) References Cited

U.S. PATENT DOCUMENTS

| | | |
|---|---|---|
| 3,573,747 A | 4/1971 | Adams et al. |
| 3,581,072 A | 5/1971 | Nymeyer |
| 3,652,795 A | 3/1972 | Wolf et al. |
| 3,687,256 A | 8/1972 | Jones |
| 4,118,788 A | 10/1978 | Roberts |
| 4,251,867 A | 2/1981 | Uchida et al. |
| 4,255,796 A | 3/1981 | Gabbe et al. |
| 4,412,287 A | 10/1983 | Braddock, III |
| 4,674,044 A | 6/1987 | Kalmus et al. |
| 4,677,552 A | 6/1987 | Sibley, Jr. |
| 4,766,293 A | 8/1988 | Boston |

(Continued)

FOREIGN PATENT DOCUMENTS

| | | |
|---|---|---|
| CA | 2253543 A1 | 10/1997 |
| CN | 1139782 A | 1/1997 |

(Continued)

OTHER PUBLICATIONS

Non-Final Office Action received for U.S. Appl. No. 09/602,110, dated Jan. 21, 2004, 14 pages.

(Continued)

*Primary Examiner* — William J. Goodchild

(74) *Attorney, Agent, or Firm* — Schwegman Lundberg & Woessner, P.A.

(57) ABSTRACT

A system communicates a client application and a web application and receives configuration data operable within the web application and the client application. The system distributes the configuration data to the client application and the web application. The distributed configuration data is then used to configure the client application and the web application.

20 Claims, 9 Drawing Sheets

(56) References Cited

U.S. PATENT DOCUMENTS

| | | |
|---|---|---|
| 4,789,928 A | 12/1988 | Fujisaki |
| 4,799,156 A | 1/1989 | Shavit et al. |
| 4,811,199 A | 3/1989 | Kuechler et al. |
| 4,812,628 A | 3/1989 | Boston et al. |
| 4,823,264 A | 4/1989 | Deming |
| 4,823,265 A | 4/1989 | Nelson |
| 4,833,607 A | 5/1989 | Dethloff et al. |
| 4,837,422 A | 6/1989 | Dethloff et al. |
| 4,864,516 A | 9/1989 | Gaither et al. |
| 4,877,947 A | 10/1989 | Mori |
| 4,903,201 A | 2/1990 | Wagner |
| 4,949,256 A | 8/1990 | Humble |
| 4,968,873 A | 11/1990 | Dethloff et al. |
| 4,982,346 A | 1/1991 | Girouard et al. |
| 4,984,155 A | 1/1991 | Geier et al. |
| 4,992,940 A | 2/1991 | Dworkin |
| 5,056,019 A | 10/1991 | Schultz et al. |
| 5,063,507 A | 11/1991 | Lindsey et al. |
| 5,063,523 A | 11/1991 | Vrenjak |
| 5,076,433 A | 12/1991 | Howes |
| 5,077,665 A | 12/1991 | Silverman et al. |
| 5,101,353 A | 3/1992 | Lupien et al. |
| 5,128,752 A | 7/1992 | Von Kohorn |
| 5,136,501 A | 8/1992 | Silverman et al. |
| 5,168,446 A | 12/1992 | Wiseman |
| 5,202,826 A | 4/1993 | McCarthy |
| 5,205,200 A | 4/1993 | Wright |
| 5,231,566 A | 7/1993 | Blutinger et al. |
| 5,243,515 A | 9/1993 | Lee |
| 5,258,908 A | 11/1993 | Hartheimer et al. |
| 5,262,942 A | 11/1993 | Earle |
| 5,280,305 A | 1/1994 | Monroe et al. |
| 5,280,422 A | 1/1994 | Moe et al. |
| 5,283,731 A | 2/1994 | Lalonde et al. |
| 5,285,383 A | 2/1994 | Lindsey et al. |
| 5,287,268 A | 2/1994 | McCarthy |
| 5,297,031 A | 3/1994 | Gutterman et al. |
| 5,297,032 A | 3/1994 | Trojan et al. |
| 5,305,200 A | 4/1994 | Hartheimer et al. |
| 5,325,297 A | 6/1994 | Bird et al. |
| 5,329,589 A | 7/1994 | Fraser et al. |
| 5,335,170 A | 8/1994 | Petteruti et al. |
| 5,339,391 A | 8/1994 | Wroblewski et al. |
| 5,345,091 A | 9/1994 | Craig et al. |
| 5,349,368 A | 9/1994 | Takeda et al. |
| 5,369,705 A | 11/1994 | Bird et al. |
| 5,375,055 A | 12/1994 | Togher et al. |
| 5,380,991 A | 1/1995 | Valencia et al. |
| 5,383,113 A | 1/1995 | Kight et al. |
| 5,384,701 A | 1/1995 | Stentiford et al. |
| 5,392,428 A | 2/1995 | Robins |
| 5,394,324 A | 2/1995 | Clearwater |
| 5,401,946 A | 3/1995 | Weinblatt |
| 5,402,336 A | 3/1995 | Spiegelhoff et al. |
| 5,418,949 A | 5/1995 | Suzuki |
| 5,421,008 A | 5/1995 | Banning et al. |
| 5,424,944 A | 6/1995 | Kelly et al. |
| 5,426,281 A | 6/1995 | Abecassis |
| 5,434,978 A | 7/1995 | Dockter et al. |
| 5,440,634 A | 8/1995 | Jones et al. |
| 5,442,546 A | 8/1995 | Kaji et al. |
| 5,442,782 A | 8/1995 | Malatesta et al. |
| 5,453,601 A | 9/1995 | Rosen |
| 5,453,926 A | 9/1995 | Stroschin et al. |
| 5,455,407 A | 10/1995 | Rosen |
| 5,479,600 A | 12/1995 | Wroblewski et al. |
| 5,485,510 A | 1/1996 | Colbert |
| 5,497,319 A | 3/1996 | Chong et al. |
| 5,515,488 A | 5/1996 | Hoppe et al. |
| 5,521,815 A | 5/1996 | Rose, Jr. |
| 5,526,479 A | 6/1996 | Barstow et al. |
| 5,535,276 A | 7/1996 | Ganesan |
| 5,535,403 A | 7/1996 | Li et al. |
| 5,537,314 A | 7/1996 | Kanter |
| 5,544,051 A | 8/1996 | Senn et al. |
| 5,553,145 A | 9/1996 | Micali |
| 5,557,518 A | 9/1996 | Rosen |
| 5,557,728 A | 9/1996 | Garrett et al. |
| 5,592,375 A | 1/1997 | Salmon et al. |
| 5,592,668 A | 1/1997 | Harding et al. |
| 5,596,994 A | 1/1997 | Bro |
| 5,598,557 A | 1/1997 | Doner et al. |
| 5,600,833 A | 2/1997 | Senn et al. |
| 5,606,691 A | 2/1997 | Watts et al. |
| 5,627,979 A | 5/1997 | Chang et al. |
| 5,638,457 A | 6/1997 | Deaton et al. |
| 5,640,569 A | 6/1997 | Miller et al. |
| 5,644,721 A | 7/1997 | Chung et al. |
| 5,652,896 A | 7/1997 | Yamauchi et al. |
| 5,657,389 A | 8/1997 | Houvener |
| 5,659,165 A | 8/1997 | Jennings et al. |
| 5,664,111 A | 9/1997 | Nahan et al. |
| 5,664,115 A | 9/1997 | Fraser |
| 5,671,364 A | 9/1997 | Turk |
| 5,675,784 A | 10/1997 | Maxwell et al. |
| 5,687,323 A | 11/1997 | Hodroff |
| 5,689,652 A | 11/1997 | Lupien et al. |
| 5,694,546 A | 12/1997 | Reisman |
| 5,696,909 A | 12/1997 | Wallner |
| 5,706,457 A | 1/1998 | Dwyer et al. |
| 5,708,780 A | 1/1998 | Levergood et al. |
| 5,710,886 A | 1/1998 | Christensen et al. |
| 5,710,889 A | 1/1998 | Clark et al. |
| 5,715,314 A | 2/1998 | Payne et al. |
| 5,715,399 A | 2/1998 | Bezos |
| 5,715,402 A | 2/1998 | Popolo |
| 5,715,466 A | 2/1998 | Flanagan et al. |
| 5,717,989 A | 2/1998 | Tozzoli et al. |
| 5,722,418 A | 3/1998 | Bro |
| 5,724,524 A | 3/1998 | Hunt et al. |
| 5,724,593 A | 3/1998 | Hargrave, III et al. |
| 5,727,165 A | 3/1998 | Ordish et al. |
| 5,729,594 A | 3/1998 | Klingman |
| 5,734,838 A | 3/1998 | Robinson et al. |
| 5,734,931 A | 3/1998 | Inoue et al. |
| 5,740,252 A | 4/1998 | Minor et al. |
| 5,757,917 A | 5/1998 | Rose et al. |
| 5,758,126 A | 5/1998 | Daniels et al. |
| 5,758,333 A | 5/1998 | Bauer et al. |
| 5,761,648 A | 6/1998 | Golden et al. |
| 5,768,581 A | 6/1998 | Cochran |
| 5,771,003 A | 6/1998 | Seymour |
| 5,771,291 A | 6/1998 | Newton et al. |
| 5,771,380 A | 6/1998 | Tanaka et al. |
| 5,774,553 A | 6/1998 | Rosen |
| 5,774,870 A | 6/1998 | Storey |
| 5,778,178 A | 7/1998 | Arunachalam |
| 5,778,213 A | 7/1998 | Shakib et al. |
| 5,778,356 A | 7/1998 | Heiny |
| 5,787,386 A | 7/1998 | Kaplan et al. |
| 5,787,402 A | 7/1998 | Potter et al. |
| 5,790,790 A | 8/1998 | Smith et al. |
| 5,794,207 A | 8/1998 | Walker et al. |
| 5,794,210 A | 8/1998 | Goldhaber et al. |
| 5,794,219 A | 8/1998 | Brown |
| 5,799,285 A | 8/1998 | Klingman |
| 5,803,500 A | 9/1998 | Mossberg |
| 5,806,044 A | 9/1998 | Powell |
| 5,818,914 A | 10/1998 | Fujisaki |
| 5,822,737 A | 10/1998 | Ogram |
| 5,826,241 A | 10/1998 | Stein et al. |
| 5,826,244 A | 10/1998 | Huberman |
| 5,826,258 A | 10/1998 | Gupta et al. |
| 5,832,452 A | 11/1998 | Schneider et al. |
| 5,835,896 A | 11/1998 | Fisher et al. |
| 5,835,911 A | 11/1998 | Nakagawa et al. |
| 5,838,965 A | 11/1998 | Kavanagh et al. |
| 5,845,143 A | 12/1998 | Yamauchi et al. |
| 5,845,265 A | 12/1998 | Woolston |
| 5,845,266 A | 12/1998 | Lupien et al. |
| 5,846,265 A | 12/1998 | McGregor et al. |
| 5,848,396 A | 12/1998 | Gerace |
| 5,850,442 A | 12/1998 | Muftic |
| 5,854,997 A | 12/1998 | Sukeda et al. |

(56) References Cited

U.S. PATENT DOCUMENTS

| | | |
|---|---|---|
| 5,855,007 A | 12/1998 | Jovicic et al. |
| 5,855,008 A | 12/1998 | Goldhaber et al. |
| 5,857,188 A | 1/1999 | Douglas |
| 5,857,201 A | 1/1999 | Wright, Jr. et al. |
| 5,857,203 A | 1/1999 | Kauffman et al. |
| 5,870,722 A | 2/1999 | Albert et al. |
| 5,872,848 A | 2/1999 | Romney et al. |
| 5,873,069 A | 2/1999 | Reuhl et al. |
| 5,874,412 A | 2/1999 | Priebe et al. |
| 5,883,620 A | 3/1999 | Hobbs et al. |
| 5,884,056 A | 3/1999 | Steele |
| 5,884,246 A | 3/1999 | Boucher et al. |
| 5,884,247 A | 3/1999 | Christy |
| 5,884,277 A | 3/1999 | Khosla |
| 5,890,138 A | 3/1999 | Godin et al. |
| 5,897,621 A | 4/1999 | Boesch et al. |
| 5,897,622 A | 4/1999 | Blinn et al. |
| 5,903,874 A | 5/1999 | Leonard et al. |
| 5,905,974 A | 5/1999 | Fraser et al. |
| 5,905,975 A | 5/1999 | Ausubel |
| 5,909,544 A | 6/1999 | Anderson, II et al. |
| 5,909,678 A | 6/1999 | Bergman et al. |
| 5,913,040 A | 6/1999 | Rakavy et al. |
| 5,913,203 A | 6/1999 | Wong et al. |
| 5,917,484 A | 6/1999 | Mullaney |
| 5,920,725 A * | 7/1999 | Ma .................. G06F 8/656 717/171 |
| 5,922,074 A | 7/1999 | Richard et al. |
| 5,923,885 A * | 7/1999 | Johnson .................. G06F 8/61 717/176 |
| 5,924,072 A | 7/1999 | Havens |
| 5,926,794 A | 7/1999 | Fethe |
| 5,944,790 A | 8/1999 | Levy |
| 5,945,652 A | 8/1999 | Ohki et al. |
| 5,945,653 A | 8/1999 | Walker et al. |
| 5,953,423 A | 9/1999 | Rosen |
| 5,956,694 A | 9/1999 | Powell |
| 5,960,382 A | 9/1999 | Steiner |
| 5,960,409 A | 9/1999 | Wexler |
| 5,963,917 A | 10/1999 | Ogram |
| 5,963,923 A | 10/1999 | Garber |
| 5,966,685 A | 10/1999 | Flanagan et al. |
| 5,969,974 A | 10/1999 | Vandenbelt et al. |
| 5,970,469 A | 10/1999 | Scroggie et al. |
| 5,971,274 A | 10/1999 | Milchman |
| 5,974,412 A | 10/1999 | Hazlehurst et al. |
| 5,983,196 A | 11/1999 | Wendkos |
| 5,987,500 A | 11/1999 | Arunachalam |
| 5,991,739 A | 11/1999 | Cupps et al. |
| 5,999,913 A | 12/1999 | Goodwin, III |
| 6,006,221 A | 12/1999 | Liddy et al. |
| 6,009,412 A | 12/1999 | Storey |
| 6,014,634 A | 1/2000 | Scroggie et al. |
| 6,016,955 A | 1/2000 | De Rooij et al. |
| 6,018,721 A | 1/2000 | Aziz et al. |
| 6,018,742 A | 1/2000 | Herbert, III |
| 6,029,015 A | 2/2000 | Ishiguro |
| 6,029,141 A | 2/2000 | Bezos et al. |
| 6,029,150 A | 2/2000 | Kravitz |
| 6,035,280 A | 3/2000 | Christensen |
| 6,035,288 A | 3/2000 | Solomon |
| 6,035,402 A | 3/2000 | Vaeth et al. |
| 6,039,244 A | 3/2000 | Finsterwald |
| 6,044,363 A | 3/2000 | Mori et al. |
| 6,047,264 A | 4/2000 | Fisher et al. |
| 6,047,274 A | 4/2000 | Johnson et al. |
| 6,049,785 A | 4/2000 | Gifford |
| 6,052,670 A | 4/2000 | Johnson |
| 6,055,518 A | 4/2000 | Franklin et al. |
| 6,058,379 A | 5/2000 | Odom et al. |
| 6,058,417 A | 5/2000 | Hess et al. |
| 6,061,448 A | 5/2000 | Smith et al. |
| 6,069,939 A | 5/2000 | Fung et al. |
| 6,073,117 A | 6/2000 | Oyanagi et al. |
| 6,077,085 A | 6/2000 | Parry et al. |
| 6,085,169 A | 7/2000 | Walker et al. |
| 6,085,176 A | 7/2000 | Woolston |
| 6,092,035 A | 7/2000 | Kurachi et al. |
| 6,092,037 A | 7/2000 | Stone et al. |
| 6,095,410 A | 8/2000 | Andersen et al. |
| 6,101,485 A | 8/2000 | Fortenberry et al. |
| 6,104,815 A | 8/2000 | Alcorn et al. |
| 6,105,001 A | 8/2000 | Masi et al. |
| 6,105,008 A | 8/2000 | Davis et al. |
| 6,119,137 A | 9/2000 | Smith et al. |
| 6,119,229 A | 9/2000 | Martinez et al. |
| 6,122,355 A | 9/2000 | Strohl |
| 6,122,606 A | 9/2000 | Johnson |
| 6,134,533 A | 10/2000 | Shell |
| 6,134,543 A | 10/2000 | Witkowski et al. |
| 6,138,106 A | 10/2000 | Walker et al. |
| 6,138,107 A | 10/2000 | Elgamal |
| 6,141,653 A | 10/2000 | Conklin et al. |
| 6,144,984 A | 11/2000 | DeBenedictis et al. |
| 6,151,589 A | 11/2000 | Aggarwal et al. |
| 6,161,082 A | 12/2000 | Goldberg et al. |
| 6,167,567 A * | 12/2000 | Chiles .................. G06F 9/454 717/173 |
| 6,173,267 B1 | 1/2001 | Cairns |
| 6,178,408 B1 | 1/2001 | Copple et al. |
| 6,189,003 B1 | 2/2001 | Leal |
| 6,192,407 B1 | 2/2001 | Smith et al. |
| 6,199,079 B1 | 3/2001 | Gupta et al. |
| 6,202,051 B1 | 3/2001 | Woolston |
| 6,205,418 B1 | 3/2001 | Li et al. |
| 6,205,433 B1 | 3/2001 | Boesch et al. |
| 6,212,556 B1 | 4/2001 | Arunachalam |
| 6,226,412 B1 | 5/2001 | Schwab |
| 6,237,145 B1 | 5/2001 | Narasimhan et al. |
| 6,243,094 B1 | 6/2001 | Sklar |
| 6,243,691 B1 | 6/2001 | Fisher et al. |
| 6,243,699 B1 | 6/2001 | Fish |
| 6,246,996 B1 | 6/2001 | Stein et al. |
| 6,266,651 B1 | 7/2001 | Woolston |
| 6,266,652 B1 | 7/2001 | Godin et al. |
| 6,272,675 B1 | 8/2001 | Schrab et al. |
| 6,275,789 B1 | 8/2001 | Moser et al. |
| 6,278,969 B1 | 8/2001 | King et al. |
| 6,278,980 B1 | 8/2001 | Wendkos |
| 6,282,507 B1 | 8/2001 | Horiguchi et al. |
| 6,285,998 B1 | 9/2001 | Black et al. |
| 6,286,002 B1 | 9/2001 | Axaopoulos et al. |
| 6,292,769 B1 | 9/2001 | Flanagan et al. |
| 6,301,554 B1 | 10/2001 | Christy |
| 6,308,172 B1 | 10/2001 | Agrawal et al. |
| 6,317,727 B1 | 11/2001 | May |
| 6,321,208 B1 | 11/2001 | Barnett et al. |
| 6,321,210 B1 | 11/2001 | O'Brien et al. |
| 6,326,962 B1 | 12/2001 | Szabo |
| 6,326,985 B1 | 12/2001 | Tazoe et al. |
| 6,330,543 B1 | 12/2001 | Kepecs |
| 6,332,126 B1 | 12/2001 | Peirce et al. |
| 6,336,009 B1 | 1/2002 | Suzumi et al. |
| 6,336,098 B1 | 1/2002 | Fortenberry et al. |
| 6,336,099 B1 | 1/2002 | Barnett et al. |
| 6,336,105 B1 | 1/2002 | Conklin et al. |
| 6,339,755 B1 | 1/2002 | Hetherington et al. |
| 6,341,958 B1 | 1/2002 | Zilberman |
| 6,345,273 B1 | 2/2002 | Cochran |
| 6,347,339 B1 | 2/2002 | Morris et al. |
| 6,349,275 B1 | 2/2002 | Schumacher et al. |
| 6,356,865 B1 | 3/2002 | Franz et al. |
| 6,363,337 B1 | 3/2002 | Amith |
| 6,386,446 B1 | 5/2002 | Himmel et al. |
| 6,389,427 B1 | 5/2002 | Faulkner |
| 6,396,515 B1 | 5/2002 | Hetherington et al. |
| 6,401,077 B1 | 6/2002 | Godden et al. |
| 6,405,175 B1 | 6/2002 | Ng |
| 6,415,270 B1 | 7/2002 | Rackson et al. |
| 6,421,653 B1 | 7/2002 | May |
| 6,434,546 B1 | 8/2002 | Williamowski et al. |
| 6,438,524 B1 | 8/2002 | Shi |
| 6,446,048 B1 | 9/2002 | Wells et al. |
| 6,450,407 B1 | 9/2002 | Freeman et al. |

(56) References Cited

U.S. PATENT DOCUMENTS

| | | |
|---|---|---|
| 6,460,015 B1 | 10/2002 | Hetherington et al. |
| 6,460,020 B1 | 10/2002 | Pool et al. |
| 6,463,404 B1 | 10/2002 | Appleby |
| 6,466,931 B1 | 10/2002 | Attaluri et al. |
| 6,473,729 B1 | 10/2002 | Gastaldo et al. |
| 6,490,602 B1 | 12/2002 | Kraemer |
| 6,493,661 B1 | 12/2002 | White, III et al. |
| 6,496,793 B1 | 12/2002 | Veditz et al. |
| 6,507,813 B2 | 1/2003 | Veditz et al. |
| 6,515,656 B1 | 2/2003 | Wittenburg et al. |
| 6,516,329 B1 | 2/2003 | Smith |
| 6,523,000 B1 | 2/2003 | Ando et al. |
| 6,523,012 B1 | 2/2003 | Glassman et al. |
| 6,523,037 B1 | 2/2003 | Monahan et al. |
| 6,526,426 B1 | 2/2003 | Lakritz |
| 6,532,444 B1 | 3/2003 | Weber |
| 6,549,922 B1 | 4/2003 | Srivastava et al. |
| 6,549,941 B1 | 4/2003 | Jaquith et al. |
| 6,556,975 B1 | 4/2003 | Wittsche |
| 6,567,821 B1 | 5/2003 | Polk |
| 6,570,591 B1 | 5/2003 | Crovetto et al. |
| 6,571,216 B1 | 5/2003 | Garg et al. |
| 6,571,241 B1 | 5/2003 | Nosohara |
| 6,574,239 B1 | 6/2003 | Dowling et al. |
| 6,578,012 B1 | 6/2003 | Storey |
| 6,594,640 B1 | 7/2003 | Postrel |
| 6,598,026 B1 | 7/2003 | Ojha et al. |
| 6,601,071 B1 | 7/2003 | Bowker et al. |
| 6,604,107 B1 | 8/2003 | Wang |
| 6,616,703 B1 | 9/2003 | Nakagawa |
| 6,623,529 B1 | 9/2003 | Lakritz |
| 6,628,307 B1 | 9/2003 | Fair |
| 6,640,221 B1 | 10/2003 | Levine et al. |
| 6,643,624 B2 | 11/2003 | Philippe et al. |
| 6,647,364 B1 | 11/2003 | Yumura et al. |
| 6,647,373 B1 | 11/2003 | Carlton-Foss |
| 6,651,220 B1 | 11/2003 | Penteroudakis et al. |
| 6,658,404 B1 | 12/2003 | Cecchini |
| 6,665,676 B2 | 12/2003 | Twig et al. |
| 6,671,681 B1 | 12/2003 | Emens et al. |
| 6,694,321 B1 | 2/2004 | Berno |
| 6,694,326 B2 | 2/2004 | Mayhew et al. |
| 6,701,314 B1 | 3/2004 | Conover et al. |
| 6,721,715 B2 | 4/2004 | Nemzow |
| 6,732,161 B1 | 5/2004 | Hess et al. |
| 6,748,367 B1 | 6/2004 | Lee |
| 6,768,997 B2 | 7/2004 | Schirmer et al. |
| 6,771,291 B1 | 8/2004 | DiStefano, III |
| 6,778,193 B2 | 8/2004 | Biebesheimer et al. |
| 6,778,993 B2 | 8/2004 | Wang |
| 6,785,671 B1 | 8/2004 | Bailey et al. |
| 6,799,165 B1 | 9/2004 | Boesjes |
| 6,839,683 B1 | 1/2005 | Walker et al. |
| 6,842,739 B2 | 1/2005 | Postrel |
| 6,857,022 B1 | 2/2005 | Scanlan |
| 6,865,547 B1 | 3/2005 | Brake, Jr. et al. |
| 6,876,997 B1 | 4/2005 | Rorex et al. |
| 6,895,386 B1 | 5/2005 | Bachman et al. |
| 6,901,408 B2 | 5/2005 | Fachat et al. |
| 6,912,539 B1 | 6/2005 | Kapitanski et al. |
| 6,925,608 B1 | 8/2005 | Neale et al. |
| 6,947,928 B2 | 9/2005 | Dettinger et al. |
| 6,965,882 B1 | 11/2005 | Lapstun et al. |
| 6,999,932 B1 | 2/2006 | Zhou |
| 7,007,026 B2 | 2/2006 | Wilkinson et al. |
| 7,013,289 B2 | 3/2006 | Horn et al. |
| 7,031,985 B1 | 4/2006 | Pecheny |
| 7,072,826 B1 | 7/2006 | Wakita |
| 7,076,453 B2 | 7/2006 | Jammes et al. |
| 7,080,104 B2 | 7/2006 | Ring et al. |
| 7,100,195 B1 | 8/2006 | Underwood |
| 7,133,835 B1 | 11/2006 | Fusz et al. |
| 7,136,863 B2 | 11/2006 | Wang |
| 7,165,041 B1 | 1/2007 | Guheen et al. |
| 7,181,438 B1 | 2/2007 | Szabo |
| 7,191,393 B1 | 3/2007 | Chin et al. |
| 7,194,403 B2 | 3/2007 | Okura et al. |
| 7,206,768 B1 | 4/2007 | deGroeve et al. |
| 7,234,110 B2 | 6/2007 | Sumitomo |
| 7,251,612 B1 | 7/2007 | Parker et al. |
| 7,296,033 B1 | 11/2007 | Lynch |
| 7,315,613 B2 | 1/2008 | Kleindienst et al. |
| 7,315,826 B1 | 1/2008 | Guheen et al. |
| 7,337,133 B1 | 2/2008 | Bezos et al. |
| 7,340,389 B2 | 3/2008 | Vargas |
| 7,398,229 B2 | 7/2008 | Budish |
| 7,418,390 B1 | 8/2008 | Jokipii |
| 7,599,857 B2 | 10/2009 | Bishop et al. |
| 7,660,740 B2 | 2/2010 | Boone et al. |
| 7,742,985 B1 | 6/2010 | Digrigoli et al. |
| 7,752,034 B2 | 7/2010 | Brockett et al. |
| 7,752,266 B2 | 7/2010 | Grove |
| 7,895,082 B2 | 2/2011 | Veres et al. |
| 7,908,132 B2 | 3/2011 | Brockett et al. |
| 7,941,348 B2 | 5/2011 | Veres et al. |
| 8,050,957 B2 | 11/2011 | Woehler |
| 8,055,582 B2 | 11/2011 | Digrigoli et al. |
| 8,078,505 B2 | 12/2011 | Veres et al. |
| 8,255,286 B2 | 8/2012 | Veres et al. |
| 8,266,016 B2 | 9/2012 | Boone et al. |
| 8,442,871 B2 | 5/2013 | Veres et al. |
| 8,601,373 B1 | 12/2013 | Ackley et al. |
| 8,639,782 B2 * | 1/2014 | Liu .................. G06F 9/44505 |
| | | 709/220 |
| 8,639,829 B2 | 1/2014 | Grove |
| 8,719,041 B2 | 5/2014 | Veres et al. |
| 8,732,037 B2 | 5/2014 | Boone et al. |
| 8,799,218 B2 | 8/2014 | Liu et al. |
| 9,092,792 B2 | 7/2015 | Veres et al. |
| 9,189,568 B2 | 11/2015 | Munro, Jr. et al. |
| 9,514,128 B2 | 12/2016 | Grove |
| 9,736,269 B2 | 8/2017 | Liu et al. |
| 2001/0007099 A1 | 7/2001 | Rau et al. |
| 2001/0009005 A1 | 7/2001 | Godin et al. |
| 2001/0011241 A1 | 8/2001 | Nemzow |
| 2001/0023407 A1 | 9/2001 | Liyanearachchi et al. |
| 2001/0027436 A1 | 10/2001 | Tenembaum |
| 2001/0027472 A1 * | 10/2001 | Guan ..................... H04W 4/00 |
| | | 709/203 |
| 2001/0029442 A1 | 10/2001 | Shiotsu et al. |
| 2001/0029455 A1 | 10/2001 | Chin et al. |
| 2001/0032164 A1 | 10/2001 | Kim |
| 2001/0032165 A1 | 10/2001 | Friend et al. |
| 2001/0032175 A1 | 10/2001 | Holden et al. |
| 2001/0032878 A1 | 10/2001 | Tsiounis et al. |
| 2001/0034694 A1 | 10/2001 | Elias |
| 2001/0039524 A1 | 11/2001 | Harrison et al. |
| 2001/0039531 A1 | 11/2001 | Aoki |
| 2001/0041973 A1 * | 11/2001 | Abkowitz ........... G06F 16/9577 |
| | | 703/23 |
| 2001/0047308 A1 | 11/2001 | Kaminsky et al. |
| 2001/0049628 A1 | 12/2001 | Icho |
| 2001/0049647 A1 | 12/2001 | Sheehan et al. |
| 2001/0049707 A1 | 12/2001 | Tran |
| 2001/0051932 A1 * | 12/2001 | Srinivasan ......... G06Q 30/0239 |
| | | 705/400 |
| 2001/0051943 A1 | 12/2001 | Drucker et al. |
| 2002/0002538 A1 | 1/2002 | Ling |
| 2002/0013767 A1 | 1/2002 | Katz |
| 2002/0013774 A1 | 1/2002 | Morimoto |
| 2002/0016831 A1 | 2/2002 | Peled et al. |
| 2002/0019837 A1 | 2/2002 | Balnaves |
| 2002/0026423 A1 | 2/2002 | Maritzen et al. |
| 2002/0029182 A1 | 3/2002 | Nakagawa |
| 2002/0029339 A1 | 3/2002 | Rowe |
| 2002/0035466 A1 | 3/2002 | Kodama |
| 2002/0035595 A1 | 3/2002 | Yen et al. |
| 2002/0038282 A1 | 3/2002 | Montgomery |
| 2002/0040344 A1 | 4/2002 | Preiser et al. |
| 2002/0042835 A1 | 4/2002 | Pepin et al. |
| 2002/0046137 A1 | 4/2002 | Odom et al. |
| 2002/0046157 A1 | 4/2002 | Solomon |
| 2002/0049664 A1 | 4/2002 | Hoffman et al. |
| 2002/0055981 A1 | 5/2002 | Spaey et al. |

(56) References Cited

U.S. PATENT DOCUMENTS

| | | |
|---|---|---|
| 2002/0069049 A1 | 6/2002 | Turner |
| 2002/0069134 A1 | 6/2002 | Solomon |
| 2002/0069184 A1 | 6/2002 | Tilly et al. |
| 2002/0073015 A1 | 6/2002 | Chan et al. |
| 2002/0073111 A1 | 6/2002 | Heyliger |
| 2002/0082953 A1 | 6/2002 | Batham et al. |
| 2002/0082977 A1 | 6/2002 | Hammond et al. |
| 2002/0087568 A1 | 7/2002 | LeDonne et al. |
| 2002/0087661 A1 | 7/2002 | Matichuk et al. |
| 2002/0091580 A1 | 7/2002 | Wang |
| 2002/0095462 A1 | 7/2002 | Beck et al. |
| 2002/0099562 A1 | 7/2002 | Bruce et al. |
| 2002/0099656 A1 | 7/2002 | Poh Wong |
| 2002/0103794 A1 | 8/2002 | Chang |
| 2002/0105532 A1 | 8/2002 | Oblinger |
| 2002/0105550 A1 | 8/2002 | Biebesheimer et al. |
| 2002/0107842 A1 | 8/2002 | Biebesheimer et al. |
| 2002/0107843 A1 | 8/2002 | Biebesheimer et al. |
| 2002/0107852 A1 | 8/2002 | Oblinger |
| 2002/0111889 A1 | 8/2002 | Buxton et al. |
| 2002/0111907 A1 | 8/2002 | Ling |
| 2002/0111967 A1 | 8/2002 | Nagase |
| 2002/0116318 A1 | 8/2002 | Thomas et al. |
| 2002/0120548 A1 | 8/2002 | Etkin |
| 2002/0120554 A1 | 8/2002 | Vega |
| 2002/0123959 A1 | 9/2002 | Mozley et al. |
| 2002/0123982 A1 | 9/2002 | Masuichi |
| 2002/0143612 A1 | 10/2002 | Barik et al. |
| 2002/0147655 A1 | 10/2002 | Say |
| 2002/0147656 A1 | 10/2002 | Tam et al. |
| 2002/0147784 A1 | 10/2002 | Gold et al. |
| 2002/0147790 A1 | 10/2002 | Snow |
| 2002/0149614 A1 | 10/2002 | Biebesheimer et al. |
| 2002/0152190 A1 | 10/2002 | Biebesheimer et al. |
| 2002/0156688 A1 | 10/2002 | Horn et al. |
| 2002/0169759 A1 | 11/2002 | Kraft et al. |
| 2002/0174010 A1 | 11/2002 | Rice |
| 2002/0174031 A1 | 11/2002 | Weiss |
| 2002/0174050 A1 | 11/2002 | Eynard et al. |
| 2002/0178178 A1* | 11/2002 | Peng .................. G06F 16/9574 |
| 2002/0184610 A1 | 12/2002 | Chong et al. |
| 2002/0188670 A1 | 12/2002 | Stringham |
| 2002/0193986 A1 | 12/2002 | Schirris |
| 2002/0198713 A1 | 12/2002 | Franz et al. |
| 2003/0004809 A1 | 1/2003 | Palcic et al. |
| 2003/0005159 A1 | 1/2003 | Kumhyr |
| 2003/0009392 A1 | 1/2003 | Perkowski |
| 2003/0011608 A1 | 1/2003 | Wada |
| 2003/0014350 A1 | 1/2003 | Duell et al. |
| 2003/0018885 A1 | 1/2003 | Landsman et al. |
| 2003/0022719 A1 | 1/2003 | Donald et al. |
| 2003/0033137 A1 | 2/2003 | Holubar et al. |
| 2003/0041014 A1 | 2/2003 | Grey et al. |
| 2003/0046059 A1 | 3/2003 | Litster et al. |
| 2003/0050861 A1 | 3/2003 | Martin et al. |
| 2003/0055747 A1 | 3/2003 | Carr et al. |
| 2003/0061306 A1 | 3/2003 | Kanno et al. |
| 2003/0069829 A1 | 4/2003 | Gathman et al. |
| 2003/0074462 A1 | 4/2003 | Grove |
| 2003/0078033 A1 | 4/2003 | Sauer et al. |
| 2003/0083952 A1 | 5/2003 | Simpson et al. |
| 2003/0084051 A1 | 5/2003 | Depura et al. |
| 2003/0088566 A1 | 5/2003 | Wang |
| 2003/0093326 A1 | 5/2003 | Poon et al. |
| 2003/0105682 A1 | 6/2003 | Dicker et al. |
| 2003/0105705 A1 | 6/2003 | Eyre |
| 2003/0110047 A1 | 6/2003 | Santosuosso |
| 2003/0115484 A1* | 6/2003 | Moriconi .............. G02B 6/132 726/1 |
| 2003/0120560 A1 | 6/2003 | Almeida |
| 2003/0126235 A1 | 7/2003 | Chandrasekar et al. |
| 2003/0131006 A1 | 7/2003 | Monahan et al. |
| 2003/0139975 A1 | 7/2003 | Perkowski |
| 2003/0144922 A1 | 7/2003 | Schrantz |
| 2003/0154134 A1 | 8/2003 | Wang |
| 2003/0163575 A1 | 8/2003 | Perkins et al. |
| 2003/0165160 A1 | 9/2003 | Minami et al. |
| 2003/0167213 A1 | 9/2003 | Jammes et al. |
| 2003/0179703 A1* | 9/2003 | Levy .................. H04L 41/06 370/230 |
| 2003/0208352 A1 | 11/2003 | Lee |
| 2003/0229544 A1 | 12/2003 | Veres et al. |
| 2003/0229545 A1 | 12/2003 | Veres et al. |
| 2003/0229554 A1 | 12/2003 | Veres et al. |
| 2004/0001106 A1 | 1/2004 | Deutscher et al. |
| 2004/0034629 A1 | 2/2004 | Genser |
| 2004/0039692 A1 | 2/2004 | Shields et al. |
| 2004/0049423 A1 | 3/2004 | Kawashima et al. |
| 2004/0073507 A1 | 4/2004 | Scott et al. |
| 2004/0078297 A1 | 4/2004 | Veres et al. |
| 2004/0128224 A1 | 7/2004 | Dabney et al. |
| 2004/0142919 A1 | 7/2004 | Meissner et al. |
| 2004/0204990 A1 | 10/2004 | Lee et al. |
| 2004/0204991 A1 | 10/2004 | Monahan et al. |
| 2004/0215612 A1 | 10/2004 | Brody |
| 2004/0254853 A1 | 12/2004 | Heene et al. |
| 2005/0004911 A1 | 1/2005 | Goldberg et al. |
| 2005/0005266 A1 | 1/2005 | Datig |
| 2005/0033655 A1 | 2/2005 | Woolston |
| 2005/0102151 A1 | 5/2005 | Fuwa et al. |
| 2005/0102328 A1 | 5/2005 | Ring et al. |
| 2005/0108380 A1 | 5/2005 | Odhner et al. |
| 2005/0197897 A1* | 9/2005 | Veit .................. G06Q 30/0206 705/14.24 |
| 2005/0203673 A1 | 9/2005 | El-Hajj et al. |
| 2005/0222984 A1 | 10/2005 | Radestock et al. |
| 2005/0240392 A1 | 10/2005 | Munro et al. |
| 2005/0256852 A1 | 11/2005 | McNall et al. |
| 2006/0020576 A1 | 1/2006 | Karube |
| 2006/0047824 A1 | 3/2006 | Bowler |
| 2006/0059246 A1 | 3/2006 | Grove |
| 2006/0074792 A1 | 4/2006 | Wagoner et al. |
| 2006/0074984 A1 | 4/2006 | Milener et al. |
| 2006/0089897 A1 | 4/2006 | Maas et al. |
| 2006/0100462 A1 | 5/2006 | Vanoppen et al. |
| 2006/0106783 A1 | 5/2006 | Saffer et al. |
| 2006/0136301 A1 | 6/2006 | Grovit |
| 2006/0167864 A1 | 7/2006 | Bailey et al. |
| 2006/0200353 A1 | 9/2006 | Bennett |
| 2006/0200462 A1 | 9/2006 | Kadayam et al. |
| 2007/0016893 A1* | 1/2007 | Branda .............. G06F 11/3447 717/127 |
| 2007/0027472 A1 | 2/2007 | Hiles et al. |
| 2007/0039025 A1 | 2/2007 | Kraft et al. |
| 2007/0081197 A1 | 4/2007 | Omoigui |
| 2007/0083612 A1 | 4/2007 | Kim |
| 2007/0088722 A1 | 4/2007 | Wang |
| 2007/0088838 A1 | 4/2007 | Levkovitz et al. |
| 2007/0112643 A1 | 5/2007 | Veres et al. |
| 2007/0156677 A1 | 7/2007 | Szabo |
| 2007/0198391 A1 | 8/2007 | Dreyer et al. |
| 2008/0043774 A1 | 2/2008 | Achtermann et al. |
| 2008/0052367 A1 | 2/2008 | Liu et al. |
| 2008/0133612 A1 | 6/2008 | Liu et al. |
| 2008/0147479 A1 | 6/2008 | Johnson |
| 2008/0152095 A1 | 6/2008 | Kleindienst et al. |
| 2010/0131510 A1 | 5/2010 | Boone et al. |
| 2010/0228536 A1 | 9/2010 | Grove |
| 2010/0312695 A1 | 12/2010 | Digrigoli et al. |
| 2011/0231530 A1 | 9/2011 | Veres et al. |
| 2012/0047029 A1 | 2/2012 | Veres et al. |
| 2012/0246233 A1 | 9/2012 | Veres et al. |
| 2012/0284304 A1 | 11/2012 | Boone et al. |
| 2014/0142919 A1 | 5/2014 | Grove |
| 2014/0143321 A1 | 5/2014 | Liu et al. |
| 2014/0297459 A1 | 10/2014 | Boone et al. |
| 2014/0297461 A1 | 10/2014 | Boone et al. |
| 2014/0297462 A1 | 10/2014 | Boone et al. |
| 2014/0297463 A1 | 10/2014 | Boone et al. |
| 2014/0297464 A1 | 10/2014 | Boone et al. |
| 2014/0297475 A1 | 10/2014 | Boone et al. |
| 2014/0297482 A1 | 10/2014 | Boone et al. |
| 2014/0297483 A1 | 10/2014 | Boone et al. |
| 2014/0297484 A1 | 10/2014 | Boone et al. |

(56) References Cited

U.S. PATENT DOCUMENTS

| | | |
|---|---|---|
| 2014/0304120 A1 | 10/2014 | Boone et al. |
| 2014/0324594 A1 | 10/2014 | Veres et al. |
| 2014/0337154 A1 | 11/2014 | Liu et al. |
| 2015/0127502 A1 | 5/2015 | Knepfle et al. |
| 2015/0371322 A1 | 12/2015 | Veres et al. |
| 2016/0071181 A1 | 3/2016 | Munro et al. |
| 2017/0083509 A1 | 3/2017 | Grove |

FOREIGN PATENT DOCUMENTS

| | | |
|---|---|---|
| CN | 102129642 A | 7/2011 |
| DE | 4308597 A1 | 8/1993 |
| EP | 251619 A2 | 1/1988 |
| EP | 254812 A2 | 2/1988 |
| EP | 542298 A2 | 5/1993 |
| EP | 590861 A2 | 4/1994 |
| FR | 2658635 A1 | 8/1991 |
| GB | 2261579 A | 5/1993 |
| GB | 2295474 A | 5/1996 |
| GB | 2296413 A | 6/1996 |
| GB | 2301919 A | 12/1996 |
| JP | 2001-000469 A | 1/2001 |
| JP | 2001-319098 A | 11/2001 |
| JP | 2001-338179 A | 12/2001 |
| JP | 2001-357248 A | 12/2001 |
| JP | 2002-092390 A | 3/2002 |
| JP | 2002-109286 A | 4/2002 |
| JP | 2002-207898 A | 7/2002 |
| KR | 2000-0018041 A | 4/2000 |
| KR | 2000-0024372 A | 5/2000 |
| KR | 2000-0037395 A | 7/2000 |
| KR | 2000-0049744 A | 8/2000 |
| KR | 2002-0059971 A | 7/2002 |
| NL | 9300266 A | 9/1994 |
| WO | 91/16691 A1 | 10/1991 |
| WO | 92/15174 A1 | 9/1992 |
| WO | 95/12169 A1 | 5/1995 |
| WO | 95/17711 A1 | 6/1995 |
| WO | 96/33568 A1 | 10/1996 |
| WO | 96/34356 A1 | 10/1996 |
| WO | 96/36024 A1 | 11/1996 |
| WO | 96/41315 A1 | 12/1996 |
| WO | 97/04411 A1 | 2/1997 |
| WO | 97/37315 A1 | 10/1997 |
| WO | 97/43727 A1 | 11/1997 |
| WO | 97/48078 A2 | 12/1997 |
| WO | 98/09447 A2 | 3/1998 |
| WO | 99/60503 A1 | 11/1999 |
| WO | 99/63461 A1 | 12/1999 |
| WO | 00/58862 A2 | 10/2000 |
| WO | 00/62231 A1 | 10/2000 |
| WO | 2000-322490 A | 11/2000 |
| WO | 00/78557 A1 | 12/2000 |
| WO | 00/79461 A1 | 12/2000 |
| WO | 01/02926 A2 | 1/2001 |
| WO | 01/16815 A2 | 3/2001 |
| WO | 01/29750 A1 | 4/2001 |
| WO | 01/37171 A1 | 5/2001 |
| WO | 01/39059 A1 | 5/2001 |
| WO | 01/52135 A1 | 7/2001 |
| WO | 01/53929 A1 | 7/2001 |
| WO | 01/57722 A1 | 8/2001 |
| WO | 01/71579 A1 | 9/2001 |
| WO | 01/71580 A1 | 9/2001 |
| WO | 01/73665 A1 | 10/2001 |
| WO | 01/80111 A1 | 10/2001 |
| WO | 01/82107 A1 | 11/2001 |
| WO | 01/82115 A1 | 11/2001 |
| WO | 02/05179 A1 | 1/2002 |
| WO | 2002/019220 A2 | 3/2002 |
| WO | 02/31737 A1 | 4/2002 |
| WO | 02/33618 A1 | 4/2002 |
| WO | 02/48828 A2 | 6/2002 |
| WO | 02/069101 A2 | 9/2002 |
| WO | 02/097582 A2 | 12/2002 |
| WO | 03/038560 A2 | 5/2003 |
| WO | 03/104931 A2 | 12/2003 |
| WO | 2004-094643 A | 3/2004 |
| WO | 2004/090666 A2 | 10/2004 |
| WO | 2004/092894 A2 | 10/2004 |

OTHER PUBLICATIONS

Response to Non-Final Office Action filed on May 24, 2004, for U.S. Appl. No. 09/602,110, dated Jan. 21, 2004, 20 pages.
Final Rejection received for U.S. Appl. No. 09/602,110 dated Sep. 2, 2004, 14 pages.
Response to Final Office Action filed on Jan. 6, 2005, for U.S. Appl. No. 09/602,110, dated Sep. 2, 2004, 16 pages.
Non-Final Office Action received for U.S. Appl. No. 09/602,110, dated Apr. 5, 2005, 12 pages.
Response to Non-Final Office Action filed on Aug. 8, 2005, for U.S. Appl. No. 09/602,110, dated Apr. 5, 2005, 19 pages.
Final Office Action received for U.S. Appl. No. 09/602,110, dated Nov. 21, 2005, 12 pages.
Response to Final Office Action filed on Jan. 25, 2006, for U.S. Appl. No. 09/602,110, dated Nov. 21, 2005, 15 pages.
Final office action received for U.S. Appl. No. 09/602,110, dated Mar. 8, 2006, 12 pages.
Response to Final Office Action filed on May 11, 2006, for U.S. Appl. No. 09/602,110, dated Mar. 8, 2006, 18 pages.
Advisory Action received for U.S. Appl. No. 09/602,110, dated May 26, 2006, 3 pages.
Pre-Appeal Brief Conference Request U.S. Appl. No. 09/602,110, filed on Jun. 30, 2006, 4 pages.
Decision on Pre-Appeal Brief received for U.S. Appl. No. 09/602,110, mailed on Aug. 15, 2006, 2 pages.
Appeal Brief for U.S. Appl. No. 09/602,110, filed on Dec. 15, 2006, 34 pages.
Examiners Answer to Appeal Brief received for U.S. Appl. No. 09/602,110, mailed on Mar. 7, 2007, 13 pages.
Reply Brief for U.S. Appl. No. 09/602,110, filed on May 7, 2007, 11 pages.
Reply Brief Acknowledgment received for U.S. Appl. No. 09/602,110, dated May 15, 2007, 2 pages.
Appeal Decision received for for U.S. Appl. No. 09/602,110, mailed on Feb. 28, 2008, 13 pages.
Non-Final Office Action received for U.S. Appl. No. 09/602,110, dated Jul. 21, 2008, 13 pages.
Response to Non-Final Office Action filed on Oct. 21, 2008, for U.S. Appl. No. 09/602,110, dated Jul. 21, 2008, 19 pages.
Final office action received for U.S. Appl. No. 09/602,110, dated Nov. 17, 2008, 13 pages.
Response to Final Office Action filed on Feb. 17, 2009, for U.S. Appl. No. 09/602,110, dated Nov. 17, 2008, 21 pages.
Non-Final Office Action received for U.S. Appl. No. 09/602,110, dated Mar. 18, 2009, 17 pages.
Response to Non-Final Office Action filed on Jul. 20, 2009, for U.S. Appl. No. 09/602,110, dated Mar. 18, 2009, 21 pages.
Final office action received for U.S. Appl. No. 09/602,110, dated Nov. 25, 2009, 18 pages.
Response to Final Office Action filed on Jan. 25, 2010, for U.S. Appl. No. 09/602,110, dated Nov. 25, 2009, 22 pages.
Appeal Decision received for U.S. Appl. No. 09/602,110, mailed on May 29, 2013, 10 pages.
Pre-Appeal Brief Request for U.S. Appl. No. 09/602,110, filed on Mar. 20, 2014, 5 pages.
Decision on Pre-Appeal Brief received for U.S. Appl. No. 09/602,110, mailed on Mar. 28, 2014, 2 pages.
Final office action received for U.S. Appl. No. 09/602,110, dated Sep. 10, 2014, 20 pages.
Restriction Requirement received for U.S. Appl. No. 10/252,126 dated Oct. 31, 2005, 7 pages.
Response to Restriction Requirement filed on Jan. 3, 2006, for U.S. Appl. No. 10/252,126, dated Oct. 31, 2005, 5 pages.
Non-Final Office Action received for U.S. Appl. No. 10/252,126, dated Feb. 3, 2006, 9 pages.

(56) References Cited

OTHER PUBLICATIONS

Response to Non-Final Office Action filed on May 8, 2006 for U.S. Appl. No. 10/252,126, dated Feb. 3, 2006, 7 pages.
Final Office Action received for U.S. Appl. No. 10/252,126, dated Jun. 27, 2006, 12 pages.
Response to Final Office Action filed on Nov. 3, 2006 for U.S. Appl. No. 10/252,126, dated Jun. 27, 2006, 5 pages.
Non-Final Office Action received for U.S. Appl. No. 10/252,126, dated Jan. 30, 2007, 10 pages.
Response to Non-Final Office Action filed on Jun. 25, 2007, for U.S. Appl. No. 10/252,126, dated Jan. 30, 2007, 11 pages.
Non-Final Office Action received for U.S. Appl. No. 10/252,126, dated Aug. 20, 2007, 9 pages.
Response to Non-Final Office Action filed on Dec. 27,2007 for U.S. Appl. No. 10/252,126, dated Aug. 20, 2007, 8 pages.
Final Office Action received for U.S. Appl. No. 10/252,126, dated Feb. 26, 2008, 13 pages.
Response to Final Office Action filed on Jul. 28, 2008, for U.S. Appl. No. 10/252,126, dated Feb. 26, 2008, 7 pages.
Final Office Action received for U.S. Appl. No. 10/252,126, dated Sep. 4, 2008, 13 pages.
Appeal Brief for U.S. Appl. No. 10/252,126, filed on Feb. 4, 2009, 22 pages.
Non-Final Office Action received for U.S. Appl. No. 10/252,128, dated Mar. 21, 2008, 14 pages.
Response to Non-Final Office Action filed on Jul. 23, 2008, for U.S. Appl. No. 10/252,128, dated Mar. 21, 2008, 11 pages.
Restriction Requirement received for U.S. Appl. No. 10/252,128, dated Nov. 24, 2008, 8 pages.
Response to Restriction Requirement filed on Dec. 23, 2008, for U.S. Appl. No. 10/252,128, dated Nov. 24, 2008, 10 pages.
Final Office Action received for U.S. Appl. No. 10/252,128, dated Apr. 3, 2009, 14 pages.
Pre-Appeal Brief Request for U.S. Appl. No. 10/252,128, filed on Aug. 3, 2009, 4 pages.
Pressler, "Sells on Ebay; Housewife Finds Herself Head of Multinational Software Firm", Washington Post, Sep. 5, 1999, 3 pages.
Queree, "Bid it Out", Global Finance, Jan. 2000, pp. 36-37.
Reck, "Formally Specifying an Automated Trade Execution System", The Journal of Systems and Software, 1993, pp. 245-252.
Roberson, "AA/US Alliance Question", Retrieved from the Internet: <URL: http://groups.google.com/q=mileage+combine+redeem&hl=en&lr=&ie=UTF-8&oe=U- TF-8&selm=6s1oa8%24v66%241%40nnrp1.dejanews.com&mum=9>, Aug. 26, 1998, 1 page.
Seminerio, "When You Gotta Take Stock", EWeek, Retrieved from the Internet: <URL: http://www.eweek.com/print_article/0,1761,a=13253,00.asp, Dec. 11, 2000, 2 pages.
Staff, "Biz to Biz Buzz", Newsbytes PM, May 24, 2000, 2 pages.
Strassmann, "The Impact of B2B", Computerworld, Oct. 2, 2000, 3 pages.
Tadjr, "Delta:A Long Relationship Ends", Retrieved from the Internet: <URL: http://groups.google.com/groups?q=mileage+combine+redeem&h1=en&lr=&ie=UTF- -8&oe=UTF-8&selm=7adhof%24me8%241%40news-1.news.gte.net&rnum=5>, Feb. 17, 1999, 1 page.
Tapscott, "eBay Endagners Traditional Papers Auctioneer Can Pack Far More Punch in Your Sales Pitch", Oct. 9, 1999, 3 pages.
Turek, "Online Portals Offer Bandwidth and Voice Services", Information Week, Retrieved from Internet URL:<http://www.informationweek.com/784/bandwidth.htm>, May 1, 2000, 4 pages.
Weiss, "Pan-Am FF Program", Google Groups, Oct. 16, 1996, 3 pages.
Wilson, "Going . . . Going . . . Gone!Bargain-hunters and collectors can scour auctions from home via the Internet", Apr. 27, 1999, 4 pages.
Wilson, "Act Globally, Think Locally", InternetWeek, Issue 789, Nov. 12, 1999, 5 pages.
Wilson, "B2B Sellers Fight Back on Pricing", InternetWeek.com, Retrieved from Internet URL: <http://www.internetweek.com/lead/lead121200.htm>, Dec. 12, 2000, 3 pages.
Wilson, "Hubs Rate Poorly on Feature Depth", InternetWeek.com, Retrieved from Internet URL: http://www.internetweek.com/lead/lead100900.htm, Oct. 9, 2000, 4 pages.
"Combinable Miles Are the Stuff of Frequent Flyers' Dreams", May 25, 1998, 4 pages.
"Ebay Blackthorne: Seller's Assistant Migration Guide", Oct. 20, 2005, 364 pages.
"Now Available—eBay Blackthorne", Oct. 20, 2005, 3 pages.
"Stamps.com Becomes the Standard in Internet Mailing and Shipping for Top Auction Resource and Trading Sites", Retrieved from the Internet: <URL: http://search.proquest.com/professional/docview/449383612?accountid=161862>, Mar. 15, 2000, 6 pages.
"Yahoo! Launches Yahoo! PayDirect for Online Person-to-Person Payments; Relationship with CIBC National Bank Allows Consumers to Easily Send and Receive Payments via Email", Business Wire, Retrieved from the Internet: <URL: http://search.proquest.com/professional/docview/445932440/14DE8530F513C8A026/1?accountid=I61862>, Jul. 31, 2000, 4 pages.
"Stamp.com Launches New iShip Service Offering to Automate Office-Based Shipping", PR Newswire, Jun. 14, 2000, 5 pages.
"Stamp.com Launches New iShip Service Offering to Automate Office-Based Shipping", PR Newswire, Jun. 14, 2000, 7 pages.
"New eBay Turbo Lister 2 Quick Start Guide", eBay Inc., Feb. 2006, 5 pages.
"Robocopy.exe Robust File Copy Utility Version XP010", 2003, 35 pages.
"Turbo Lister Listing Activity Quick Start Guide", eBay Inc., Apr. 2007, 8 pages.
Notice of Allowance received for U.S. Appl. No. 14/790,661, dated Apr. 24, 2018, 5 pages.
Preliminary Amendment for U.S. Appl. No. 14/165,359, filed on Mar. 7, 2014, 6 pages.
Non-Final Office Action received for U.S. Appl. No. 14/165,359, dated Apr. 6, 2015, 13 pages.
Applicant Initiated Interview Summary received for U.S. Appl. No. 14/165,359, dated May 4, 2015, 3 pages.
Response to Non-Final Office Action filed on Sep. 8, 2015 for U.S. Appl. No. 14/165,359, dated Apr. 6, 2015, 11 pages.
Notice to Non-Compliant Amendment for U.S. Appl. No. 14/165,359, dated Sep. 25, 2015, 3 pages.
Response to Non-Final Office Action filed on Nov. 24, 2015 for U.S. Appl. No. 14/165,359 dated Apr. 6, 2015, 11 pages.
Final Office Action received for U.S. Appl. No. 14/165,359, dated Feb. 26, 2016, 11 pages.
Applicant Initiated Interview Summary received for U.S. Appl. No. 14/165,359, dated Apr. 20, 2016, 3 pages.
Response to Final Office Action filed on Aug. 26, 2016, for U.S. Appl. No. 14/165,359, dated Feb. 26, 2016, 10 pages.
Non-Final Office Action received for U.S. Appl. No. 14/165,359, dated Sep. 22, 2016, 7 pages.
Response to Non-Final Office Action filed on Nov. 8, 2016 for U.S. Appl. No. 14/165,359 dated Sep. 22, 2016, 8 pages.
Final Office Action received for U.S. Appl. No. 14/165,359, dated Nov. 25, 2016, 6 pages.
Response to Final Office Action filed on Mar. 27, 2017 for U.S. Appl. No. 14/165,359 dated Nov. 25, 2016, 8 pages.
Notice of Allowance received for U.S. Appl. No. 14/165,359, dated Apr. 12, 2017, 5 pages.
Response to Appeal Decision filed on Apr. 28, 2008 for U.S. Appl. No. 09/602,110 mailed on Feb. 28, 2008, 17 pages.
Advisory Action received for U.S. Appl. No. 09/602,110, dated Feb. 22, 2010, 3 pages.
Appeal Brief for U.S. Appl. No. 09/602,110, filed on Apr. 26, 2010, 37 pages.
Examiners Answer to Appeal Brief received for U.S. Appl. No. 09/602,110, mailed on Jun. 11, 2010, 20 pages.
Reply Brief for U.S. Appl. No. 09/602,110, filed on Aug. 11, 2010, 6 pages.
Reply Brief Acknowledgment received for U.S. Appl. No. 09/602,110, mailed on Aug. 18, 2010, 2 pages.
Response to Appeal Decision filed on Jul. 19, 2013 for U.S. Appl. No. 09/602,110, mailed on May 29, 2013, 19 pages.

(56) References Cited

OTHER PUBLICATIONS

Non-Final Office Action received for U.S. Appl. No. 09/602,110, dated Aug. 14, 2013, 20 pages.
Response to Non-Final Office Action filed on Nov. 14, 2013 for U.S. Appl. No. 09/602,110, dated Aug. 14, 2013, 21 pages.
Final Office Action received for U.S. Appl. No. 09/602,110, dated Nov. 25, 2013, 18 pages.
"Yahoo!—Regionai:Countries:Sweden", Retrieved from the Internet URL <http://web.archive.org/web/19970616194441/www.yahoo.com/Regionai/Countries/Sweden/, Jun. 16, 1997, 2 pages.
Asbrand, "Taking Stock in Trading Exchanges", Retrieved from the Internet: <URL: http://www.reed-electronics.com/eb-mag/index.asp?layout=articlePrint&arti- cleID=CA42124>, Apr. 1, 2000, 5 pages.
"Personal Optimized Decision/Transaction Program", IBM Technical Disclosure Bulletin, Jan. 1995, pp. 83-84.
Bers, "Cyberspace: The New Promised Land", Bank Systems & Technology, 32(7), Jul. 1995, pp. 32-37.
Bidnbuy, "Going, going, virtually gone: The success of online auctions in the US such as eBay has prompted the rise of European auctioneers who want to emulate its model", Business and Finance, Jun. 17, 1999, 3 pages.
Brown, "What Does it Take to Make a Buck off of Usenet?", Retrieved from the Internet: <URL: www.salon.com/tech/feature/1999/05/24/deja/print.html>, May 24, 1999, 4 pages.
Business Wire, "Yahoo! Launches Three New European Auctions Services; Yahoo! Italy, Yahoo! Spain and Yahoo! Sweden Unveil New Local Auctions", Business Wire, Sep. 23, 1999, 3 pages.
Business Wire, "Subasta.com Enters Into Strategic Partnership with From2.com", Business Wire, Obtained from Proquest, Document No. 43206061, Jul. 16, 1999, 2 pages.
Chan et al., "Design and Implementation of a Mobile Agent-Based Auction System", 2001, pp. 740-743.
Chapman et al., "Roget's International thesaurus fourth", Thomas Y Crowell, Publishers New York sec 637, 1997, 3 pages.
Chen, "Bidders Strategy Under Group-Buying Auction on the Internet", Systems, Man and Cybernetics, Part A, IEEE Transactions on, vol. 32 Issue: 6, Nov. 2002, 1 page.
Cohen, "Citibank's Bid to Be the King of Cash (Citibank unveils Electronic Monetary System prototype, a digital currency system capable of replacing all current monetary systems)", Bank Technology News, 9(9), Sep. 1996, 6 pages.
Cooper et al., "Playing Catch-Up: U.S. Web Firms Get Slow Start in Europe, Amid Crowded Field—Used to Being First and Best at Home, They Stumble in World's No. 2 Market—Pouncing on Amazon Delays", Wall Street Journal Europe, Obtained from Proquest, Nov. 15, 1999, 5 pages.
Creed, "Haggling Online in the Philippines:Magtawaran Auction site:Company Business and Marketing:Brief Article", Newsbytes News Network, Retrieved from Internet URL:<http://www.findarticles.com/cf_dls/m0NEW/2000_May_1/161859593/p1/article.jhtml>, May 1, 2000, 2 pages.
Dalton, "Going, Going, Gone!:E-commerce is leading to an anything-goes environment of online bidding and dynamic pricing", Information Week, Retrieved from Internet URL:<http://www.informationweek.com/shared/printHTMLArticle.jhtml?article=/755/prauct.htm>, Oct. 4, 1999, 4 pages.
Davidow, "The Dynamics of Pricing: Technology Brings New Efficiencies to the Ancient Practice of Haggling", Feb. 2000, pp. 42.
Edwards, "Your Web Browser is Bugged", Retrieved from Internet URL:<http://www.ntsecurity.net/ Articles/Index.cfm? ArticleID=9543, Jul. 13, 2000, 3 pages.
Edwards, "New B2B Player Spreads Benefits of E-Commerce", Communications News, Jan. 2001, 4 pages.
Fisher, "More Goods on the Block", EWeek, Dec. 18, 2000, 4 pages.
Franse, "Distribution Briefs—Are Auctions in Vogue?", Var Business, Retrieved from internet URL: <http://www.varbusiness.com/Components/printArticle.asp? ArticleID=33901>, Mar. 11, 2002, 2 pages.

Furger, "Working the Web Bazaar", PC World magazine, Retrieved from Internet URL: <http://www. pcworld.com/resource/printable/article/0,aid, 15823, 00.asp> May 2000, 10 pages.
Goldsborough, "Internet Auctions Examined", Link-Up, 17, Nov./Dec. 2000, pp. 24.
Goldstein, "Medical E-procurement-Navigating in a B2B Market", Health Management Technology, 21(8), Aug. 2000, 1 page.
Greengard, "What Traffic Will Bear", Business Finance Article Archives, Retrieved from Internet URL: <http://www.businessfinancemag.com/magazine/archives/article.html?articleID=13725 & Print=Y>, Mar. 2001, 4 pages.
Gupta, "Most Flexible FF?", Google Groups, Oct. 29, 1996, 2 pages.
Hauser, "Anonymous Delivery of Goods in Electronic Commerce", IBM Technical Disclosure Bulletin, 39(3), Mar. 1996, pp. 363-366.
Jaroneczyk, "Sold on an Old Idea", Internet World, Retrieved from Internet URL:<http://www. findarticles.com/cf _0/mODXS/4_7/70506202/print.jhtml> Feb. 15, 2001, 3 pages.
Kalin, "How Long Can You Go?", Darwin, Retrieved from Internet URL: <http://www.darwinmag.com/read/040101/low.html, Apr. 2001>, 5 pages.
Kumar et al., "Sales Promotions on the Internet", 1998, 11 pages.
Lassila, "Web metadata: A Matter of Semantics", IEEE Internet Computing, vol. 2, Issue: 4, Jul. 1998, 15 pages.
Lee et al., "Considering Exchange Rate Movements in Economic Evaluation of Foreign Direct Investments", Engineering Economist, 40(2), Winter, 1995, pp. 171-199.
Lindsay et al., "The Historic Use of Computerized Tools for Marketing and Market Research: A Brief Survey", Dec. 27, 2001, 20 pages.
"HP Completes Online Strategy With Launch of E-commerce Site", M2 Presswire, Jun. 29, 1999, 3 pages.
Mardesich, "Site Offers Clearance for End-of-Life Products—Onsale Takes Auction Gavel Electronic", Computer Reseller News, Jul. 8, 1996, 2 pages.
McClenahen, "Net Gains", Industry Week, Cleveland, May 17, 1999, 8 pages.
McDougall, "Electronic Evolution", Canadian Banker, 102(5), Sep.-Oct. 1995, 10 pages.
McKendrick, "Old Economy Players Step Up", EC World, Nov. 2000, pp. 35-44.
Merlino, "Auction Anxiety", Oct. 2000, pp. 247-251.
Mitchell, "BayBuilder Delivers Easy, Profitable Reverse Auctions", Infoworld, Retrieved from Internet URL:<http://archive.infoworld.com/articles/eu/xml/00/06/05/000605eubaybuilder.xml> , Jun. 2, 2000, 5 pages.
Mollison, "America West Airlines Opt for Reverse Auctions", Internet World, 8(4), Apr. 1, 2002, 5 pages.
Mollman, "Are You Ready to Bicker Over the Cost of that Sandwich? In the New Economy You Won't Pay Retail for Anything.", PC/Computing, Jan. 1, 2000, 3 pages.
Mollman, "Sold! Never Pay Retail Again. Online auctions are Changing the way Businesses Buy and sell Everything", PC Computing, Feb. 2000, 10 pages.
Morgan, "Pick Your Lot: Build consumer-oriented auctions with AuctionBuilder", Sep. 18, 2000, 4 pages.
Morin, "Multilingual Communications Device", U.S. Appl. No. 08/200,049, filed Feb. 22, 1994, Published Mar. 2, 2004, 7 pages.
Ohlson, "Looking Behind, Beyond B2B Marketplace Woes", Network World Fusion, Retrieved from Internet URL<http://www.nwfusion.com/cgi-bin/mailto/x.cgi>, Jun. 11, 2001, 4 pages.
Pacek, "American Express Membership Rewards: A Good Deal or Not?", Retrieved from the Internet: <URL: http://groups.google.com/groups?q=combine+points+programs&hl=en&lr=&ie=UTF-8&oe=UTF-8&selm=crazyone-2509972357090001%040async83.citynet.com&mum=4- >, Sep. 25, 1997, 2 pages.
Patel et al., "New Platform Options Fuel E-Commerce", Retrieved from Internet URL:< http://www.informationweek.com/779/ecommerce.htm>, Mar. 27, 2000, 4 Pages.
Piccinelli et al., "E-Service Composition: Supporting Dynamic Definition of Process-Oriented Negotiation Parameters", 2001, pp. 727-731.

(56) References Cited

OTHER PUBLICATIONS

Pollick, "Sold! on eBay: As antique and collectible dealers see their sales increase through online auctions such as eBay, more of them are deciding that the internet is not something to be afraid of.", Sarasota Herald Tribune, Obtained from Proquest, Document No. 45499060, Oct. 11, 1999, 8 pages.

"Mitsubishi Venture, Wells Fargo Partner to Offer Multi-Currency E-Commerce Storefront", PR Newswire, Mar. 1, 1999, 3 pages.

Examiner Initiated Interview Summary received for U.S. Appl. No. 10/252,126, dated Oct. 26, 2007, 1 page.

Decision on Appeal Brief received for U.S. Appl. No. 10/252,126, mailed on Sep. 15, 2010, 8 pages.

Response to Decision on Appeal filed on Oct. 25, 2010 for U.S. Appl. No. 10/252,126, mailed on Sep. 15, 2010, 11 pages.

Notice of Allowance received for U.S. Appl. No. 10/252,126, dated Dec. 30, 2010, 13 pages.

Examiner's Answer to Appeal Brief filed for U.S. Appl. No. 10/252,126, on Apr. 29, 2009, 12 pages.

Examiner's Answer to Appeal Brief received for U.S. Appl. No. 10/252,128, mailed on Mar. 31, 2010, 11 pages.

Response to Decision on Appeal filed on Mar. 28, 2013 for U.S. Appl. No. 10/252,128, mailed on Jan. 31, 2013, 9 pages.

Response to Final Office Action and Advisory Action filed on Apr. 10, 2007 for U.S. Appl. No. 10/252,127, dated Oct. 6, 2006 and Jan. 10, 2007, 11 pages.

Advisory Action received for U.S. Appl. No. 10/252,127, dated Mar. 29, 2010, 3 pages.

Pre-Appeal Brief Request for U.S. Appl. No. 10/252,127, filed on Apr. 7, 2010, 5 pages.

Response to Final Office Action and Advisory Action filed on Jun. 14, 2010 for U.S. Appl. No. 10/252,127, dated Jan. 7, 2010 and Mar. 29, 2010, 15 pages.

Non-Final Office Action received for U.S. Appl. No. 10/252,127, dated Sep. 10, 2010, 11 pages.

Response to Non-Final Office Action filed on Jan. 14, 2011, for U.S. Appl. No. 10/252,127, dated Sep. 10, 2010, 18 pages.

Notice of Allowance received for U.S. Appl. No. 10/252,127, dated Jul. 28, 2011, 6 pages.

Response to Final Office Action filed on Sep. 23, 2010, for U.S. Appl. No. 10/252,129, dated Apr. 23, 2010, 16 pages.

Advisory Action received for U.S. Appl. No. 10/252,129, dated Oct. 4, 2010, 2 pages.

Applicant Initiated Interview Summary received for U.S. Appl. No. 14/268,986, dated Sep. 16, 2016, 3 pages.

Response to Non-Final Office Action filed on Sep. 19, 2016, for U.S. Appl. No. 14/268,986, dated Jun. 17, 2016, 24 pages.

Non-Final Office Action received for U.S. Appl. No. 14/268,986, dated Feb. 10, 2017, 18 pages.

Response to Non-Final Office Action filed on May 10, 2017 for U.S. Appl. No. 14/268,986 dated Feb. 10, 2017, 30 pages.

Applicant Initiated Interview Summary received for U.S. Appl. No. 14/268,986, dated May 12, 2017, 3 pages.

Final Office Action received for U.S. Appl. No. 14/268,986, dated Sep. 11, 2017, 21 pages.

Notice of Allowance received for U.S. Appl. No. 11/508,420, dated Nov. 27, 2013, 2 pages.

Response to Non-Final Office Action filed on Oct. 14, 2013, for U.S. Appl. No. 13/285,916, dated Jul. 15, 2013, 13 pages.

Preliminary Amendment for U.S. Appl. No. 13/489,646, filed on Apr. 17, 2013, 29 pages.

Response to Non-Final Office Action filed on Jun. 8, 2010, for U.S. Appl. No. 11/647,728, dated Mar. 8, 2010, 13 pages.

Final Office Action received for U.S. Appl. No. 11/647,728, dated Jul. 13, 2010, 17 pages.

Examiner Initiated Interview Summary received for U.S. Appl. No. 11/647,728, dated Aug. 11, 2010, 3 pages.

Response to Final Office Action filed on Sep. 22, 2010, for U.S. Appl. No. 11/647,728, dated Jul. 13, 2010, 14 pages.

Notice of Allowance received for U.S. Appl. No. 11/647,728, dated Oct. 19, 2010, 11 pages.

Pre-Interview First Office Action received for U.S. Appl. No. 14/790,661, dated May 18, 2017, 5 pages.

First Action Interview Office Action received for U.S. Appl. No. 14/790,661, dated Aug. 8, 2017, 5 pages.

Response to First Action Interview Office Action filed on Dec. 7, 2017, for U.S. Appl. No. 14/790,661, dated Aug. 8, 2017, 13 pages.

Final Office Action received for U.S. Appl. No. 14/790,661, dated Feb. 9, 2018, 8 pages.

"Canadian Plus inter@ctive: Copyright (c)—Canadian Airlines International Ltd.", Retrieved from the Internet: <URL: http://web.archive.org/web/19970704234541/www.cdnair.ca/cpi.html->, 1994-1997, 1 page.

"Andale Lister", Copyright 2002 Andale Inc., [Archived Oct. 25, 2002]. Retrieved from the Internet: <URL: http://web.archive.org/web/20021025121452/http://www.andale.com/corp/prod- ucts/sell.jsp>, Accessed Dec. 10, 2007, 3 pages.

"Andale Lister: Bulk List", Copyright 2002 Andale Inc., [Archived Oct. 5, 2002], Retrieved from the Internet: <URL: http://web.archive.org/web/20021005074745/http://www.andale.com/corp/products/qs_sell_details_bulklist.jsp>, Accessed Dec. 10, 2007, 1 page.

"Andale Lister: Design Center", Copyright 2002 Andale Inc., [Archived Dec. 15, 2002], Retrieved from the Internet: <URL: http://web.archive.org/web/20021215192044/http://www.andale.com/corp/products/qs_sell_details_designcenter.jsp>, Accessed Dec. 10, 2007, 1 page.

"Andale Lister: In-Line Images", Copyright 2002 Andale Inc., [Archived Dec. 15, 2002], Retrieved from the Internet: <URL: http://web.archive.org/web/20021215192408/http://www.andale.com/corp/products/qs_sell_details_inlineimg.jsp>, Accessed Dec. 10, 2007, 1 page.

"Andale Lister: Inventory Dashboard", Copyright 2002 Andale Inc., [Archived Dec. 15, 2002], Retrieved from the Internet: <URL: http://web.archive.org/web/20021215192408/http://www.andale.com/corp/products/qs_sell_details_invdashboard.jsp, Accessed Dec. 10, 2007, 2 pages.

"Andale Lister: Launch Scheduler", Copyright 2002 Andale Inc., [Archived Dec. 15, 2002]. Retrieved from the Internet: <URL: http://web.archive.org/web/20021215192724/http://www.andale.com/corp/products/qs_sell_details_launchsched.jsp, Accessed Dec. 10, 2007, 1 page.

"Andale Lister: Online or Offline", Copyright 2002 Andale Inc., [Archived Dec. 15, 2002], Retrieved from the Internet: <URL: http://web.archive.org/web/20021215194722/http://www.andale.com/corp/products/qs_sell_details_onoffline.jsp>, Accessed Dec. 10, 2007, 2 pages.

"Andale Lister: Overview", Copyright 2002 Andale Inc., [Archived Dec. 1, 2002]. Retrieved from the Internet: <URL: http://web.archive.org/web/20021201081906/http://www.andale.com/corp/products/qs_overview.jsp, Accessed Dec. 10, 2007, 4 pages.

"Aviation Competition: Effects on Consumers from Domestic Airline Alliances Vary", Retrieved from the Internet: <URL: http://groups.google.com/groups?q=mileage+combine+redeem&hl=en&lr=&ie=UTF--8&oe=UTF-8&selm=GAORPTrc99037.txtp2%40us.govnews.org&mum=6>, Feb. 2, 1999, 25 pages.

BarterBee.com: Buy, Sell, Why Points?, Retrieved from the Internet URL:<htttp://www.barterbee.com/xmain0003/?hp=trade >, Copyright 1948-2004, 1 page.

BarterBee.com: Help & FAQ, Retrieved from the Internet URL: <http ://www.barterbee.com/xmain0005/?_hp=faq_4_requesting>, Copyright 1948-2004, 2 pages.

BarterBee.com: Points Q & A, Retrieved from the Internet URL: <http://www.barterbee.com/xmain0003/? hp=point>, Copyright 1948-2004, 1 page.

"Business Roundup", Internet Week, Apr. 5, 1999, 1 page.

"Continental Airlines OnePass—Interactive Reward Charts", [Online]. Retrieved from the Internet: <URL: ile:/1\\Bstz-tkgukobdiS\CLIENTS.sub.-A.sub.--M\EBA Y\P107\Prior0/o20Art\Copy0/o20of0/02ORewards>, Accessed Jul. 22, 2004, 8 pages.

"Continental Airlines ShopOnePass", Copyright 2002 Continental Airlines Inc., Retrieved from the Internet: <URL: file://\\Bstz-tkgukobdi5\CLIENTS_A_M\EBAY\P107\Prior0/o20Art\-Continental0/o20Airlines0/o . . . >, Accessed Jul. 28, 2004, 1 page.

(56) References Cited

OTHER PUBLICATIONS

"Ebay—Your Personal Trading Community", Retrieved from the Internet: <URL: http://web.archive.org/web/19991007062815/www.ebay.com>, Oct. 6, 1999, 23 pages.
"Exchange of Ideas: Why the Street is in Love with Purchasepro.com's Congeries of Revenue Models", Mar. 1, 2000, 2 pages.
"KMWorld Magazine:Family of Web Rental Applications Unveiled", vol. 7, Issue 1, Jan. 1, 1998, 2 pages.
"Government Agencies can Procure Materials", Link-up, vol. 17, Issue 1, Jan. 1, 2000, pp. 19.
"Keeping You Informed: Canadian Plus Online", Retrieved from Internet URL:<www.cdnair.ca>, pp. 6-7.
"Last Minute Gift Ideas and Stocking Stuffers from AT&T", AT&T News Release, Retrieved from the Internet: <URL: http://www.att.com/news/1294/941221.csa.html>, Dec. 21, 1994, 2 pages.
"New Ebay-like Auction Software Released", Business Wire, Mar. 17, 1999, 1 page.
"OED Online Main Entry Text Frame", Retreived from Internet <URL: http://dictionary.oed.com/cgi/entry_main/50218727?query_type=word&queryword=select&first=1&max_to show+10&sort at Http://dictionary.oed.com/cgi/entry_main/50218727?query_type=word&queryword=approve&first=1&max_to show+10&sort>, Accessed Apr. 14, 2008, 8 pages.
"OnePass Online Auction", Copyright 2002 Continental Airlines Inc., Retrieved from the Internet: <URL: file:/ 1\\Bstz-tkgukobdl5\CLIENTS_A_M\EBAY\PI07\Prior%/20Art\Copy%20of>/o200nePass%200nline%2 .>, Accessed Jul. 28, 2004, 1 page.
"Onsale Joins Fray as Online Shopping Picks Up Speed: Internet Booms", Jun. 5, 1995, 1 page.
"Onsale: Onsale Brings Thrill of Auctions and Bargain Hunting Online; Unique Internet retail service debuts with week-long charity auction for the Computer Museum in Boston", Business Wire, May 24, 1995, 3 pages.
"Peerflix: How it Works", Copyright © 2004-2006 Peerflix, Inc. ,Retrieved from the Internet: <URL: http://www.peerflix.com/Default.aspx?tabid=64>, Accessed on Aug. 14, 2006, 2 pages.
"Peerflix: Netflix, Blockbuster and Peerflix: Compare Online DVD Rentals vs. Buying vs.Trading", Copyright © 2004-2006 Peerflix, Inc., Retrieved from the Internet: <URL:http://www.peerflix.com/Default.aspx?tabid=171>, Accessed on Aug. 14, 2006, 2 pages.
"PSINet Teams with WorldPay Ltd. to Launch the World's First Secure Multi-Currency Solution for International Electronic Commerce", PR Newswire Association, Oct. 6, 1997, 3 pages.
"Requesting a Reward:Continental Airlines Requesting a Reward", Retrieved from the Internet: <URL: file://\\Bstz-tkgukobdl5\CLIENTS_A_M\EBAY\P107\Prior%20Art\Rewards2_files\onepass_fr.sub.--main.sub.--files\r >, Accessed Jul. 28, 2004, 2 pages.
"RSA signs deal with China", Internet Week, 2(7), Feb. 12, 1996, 2 pages.
"Service Helps Hospitals Shop Online", Link-up, May/Jun. 2000, 1 page.
"Web Beacon:Webopedia.com", Aug. 21, 2003, 3 pages.
"Welcome to the Sloan Career Development Office Interview Bidding and Scheduling System", CDO Interview Bidding & Scheduling—Login, Retrieved from the Internet: <URL: file:/ 1\\Bstz-tkgukobdl5\CLIENTS\EBAY\P107\Prior%20Art\CD0%20Interview%20Bidd >, Accessed Mar. 25, 2004, 3 pages.
"Yahoo Homepage", Internet Archive Wayback Machine, http://web.archive.org/web/19991003015603/http://www.yahoo.com/index.html, Oct. 3, 1999, 1 page.
"Yahoo!—Regional:Countries:Afghanistan", Retrieved from the Internet URL: <http://web.archive.org/web/19970616192328/http://dir.yahoo.com/Regional/countries/afghanistan, Accessed Sep. 19, 2006, 1 page.
Non-Final Office Action received for U.S. Appl. No. 11/508,420, dated Feb. 5, 2009, 16 pages.
Response to Non Final Office Action filed on May 5, 2009, for U.S. Appl. No. 11/508,420, dated Feb. 5, 2009, 11 pages.
Final Office Action received for U.S. Appl. No. 11/508,420, dated Jul. 31, 2009, 18 pages.
Response to Final Office Action filed on Sep. 30, 2009, for U.S. Appl. No. 11/508,420, dated Jul. 31, 2009, 13 pages.
Non-Final Office Action received for U.S. Appl. No. 11/508,420, dated Dec. 30, 2009, 17 pages.
Response to Non-Final Office Action filed on Apr. 30, 2010, for U.S. Appl. No. 11/508,420, dated Dec. 30, 2009, 13 pages.
Final Office Action received for U.S. Appl. No. 11/508,420, dated Jul. 22, 2010, 12 pages.
Response to Final Office Action filed on Sep. 21, 2010, for U.S. Appl. No. 11/508,420, dated Jul. 22, 2010, 13 pages.
Advisory Action received for U.S. Appl. No. 11/508,420, dated Oct. 29, 2009, 2 pages.
Advisory Action received for U.S. Appl. No. 11/508,420, dated Oct. 7, 2010, 3 pages.
Pre-Appeal Brief Request for U.S. Appl. No. 11/508,420, filed on Oct. 22, 2010, 5 pages.
Decision on Pre-Appeal Brief Request for U.S. Appl. No. 11/508,420, mailed on Dec. 21, 2010, 2 pages.
Appeal Brief or U.S. Appl. No. 11/508,420, filed on Jan. 19, 2011, 23 pages.
Non-Final Office Action received for U.S. Appl. No. 11/508,420, dated Apr. 27, 2011, 15 pages.
Response to Non-Final Office Action filed on Jul. 15, 2011, for U.S. Appl. No. 11/508,420, dated Apr. 27, 2011, 11 pages.
Non-Final Office Action received for U.S. Appl. No. 11/508,420, dated Oct. 5, 2011, 12 pages.
Response to Non-Final Office Action filed on Dec. 22, 2011, for U.S. Appl. No. 11/508,420, dated Oct. 5, 2011, 11 pages.
Non-Final Office Action received for U.S. Appl. No. 11/508,420, dated Mar. 9, 2012, 11 pages.
Response to Non-Final Office Action filed on Jun. 11, 2012, for U.S. Appl. No. 11/508,420, dated Mar. 9, 2012, 11 pages.
Final Office Action received for U.S. Appl. No. 11/508,420, dated Aug. 17, 2012, 12 pages.
Response to Final Office Action filed on Nov. 12, 2012, for U.S. Appl. No. 11/508,420, dated Aug. 17, 2012, 11 pages.
Notice of Allowance received for U.S. Appl. No. 11/508,420, dated Sep. 19, 2013, 6 pages.
Non-Final Office Action received for U.S. Appl. No. 13/285,916, dated Jun. 4, 2012, 16 pages.
Response to Non- Final Office Action filed on Aug. 30, 2012, for U.S. Appl. No. 13/285,916, dated Jun. 4, 2012, 15 pages.
Final Office Action received for U.S. Appl. No. 13/285,916, dated Nov. 21, 2012, 17 pages.
Response to Final Office Action filed on Jan. 17, 2013, for U.S. Appl. No. 13/285,916, dated Nov. 21, 2012, 15 pages.
Advisory Action received for U.S. Appl. No. 13/285,916 dated Jan. 30, 2013, 3 pages.
Non-Final Office Action received for U.S. Appl. No. 13/285,916, dated Jul. 15, 2013, 17 pages.
Final Office Action received for U.S. Appl. No. 13/285,916, dated Apr. 23, 2014, 16 pages.
Pre-Appeal Brief Request for U.S. Appl. No. 13/285,916, filed on Jun. 20, 2014, 5 pages.
Decision on Pre-Appeal Brief for U.S. Appl. No. 13/285,916, mailed on Jul. 15, 2014, 2 pages.
Non-Final Office Action received for U.S. Appl. No. 13/285,916, dated Oct. 30, 2014, 19 pages.
Applicant Initiated Interview Summary received for U.S. Appl. No. 13/285,916, dated Jan. 22, 2015, 3 pages.
Response to Non- Final Office Action filed on Jan. 30, 2015, for U.S. Appl. No. 13/285,916, dated Oct. 30, 2014, 22 pages.
Notice of Allowance received for U.S. Appl. No. 13/285,916, dated Mar. 3, 2015, 5 pages.
Supplemental Notice of Allowability received for U.S. Appl. No. 13/285,916, dated Apr. 1, 2015, 4 pages.
Supplemental Notice of Allowability received for U.S. Appl. No. 13/285,916, dated Jun. 18, 2015, 4 pages.
Non-Final Office Action received for U.S. Appl. No. 13/080,426, dated Oct. 31, 2011, 8 pages.
Response to Non-Final Office Action filed on Dec. 28, 2011, for U.S. Appl. No. 13/080,426, dated Oct. 31, 2011, 9 pages.

(56) References Cited

OTHER PUBLICATIONS

Notice of Allowance received for U.S. Appl. No. 13/080,426, dated Jan. 26, 2012, 7 pages.
Notice of Allowance received for U.S. Appl. No. 13/080,426, dated Apr. 23, 2012, 7 pages.
Non-Final Office Action received for U.S. Appl. No. 13/489,646, dated Sep. 19, 2012, 8 pages.
Response to Non-Final Office Action filed on Dec. 3, 2012, for U.S. Appl. No. 13/489,646, dated Sep. 19, 2012, 11 pages.
Notice of Allowance received for U.S. Appl. No. 13/489,646, dated Jan. 10, 2013, 7 pages.
312 Amendment for U.S. Appl. No. 13/489,646, filed on Mar. 7, 2013, 4 pages.
PTO Response to Rule 312 Amendment for U.S. Appl. No. 13/489,646, dated Mar. 14, 2013, 2 pages.
PTO Response to Rule 312 Amendment for U.S. Appl. No. 13/285,916, dated Jun. 9, 2015, 2 pages.
Non-Final Office Action received for U.S. Appl. No. 11/647,728, dated Mar. 8, 2010, 18 pages.
Preliminary Amendment for U.S. Appl. No. 14/790,661, filed on Jul. 7, 2015, 7 pages.
Clemons, "Evaluating the Prospects for Alternative Electronic Securities", Proceedings of ICIS 91: 12th International Conference on Information Systems, Dec. 16-18, 1991, pp. 53-63.
Decision on Pre-Appeal Brief received for U.S. Appl. No. 10/252,128, mailed on Oct. 15, 2009, 2 pages.
Appeal Brief for U.S. Appl. No. 10/252,128, filed on Dec. 15, 2009, 23 pages.
Decision on Appeal received for for U.S. Appl. No. 10/252,128, mailed on Jan. 31, 2013, 6 pages.
Notice of Allowance received for U.S. Appl. No. 10/252,128, dated May 30, 2013, 9 pages.
Notice of Allowance received for U.S. Appl. No. 10/252,128, dated Dec. 23, 2013, 10 pages.
Non-Final Office Action received for U.S. Appl. No. 10/252,127, dated Mar. 21, 2006, 10 pages.
Response to Non-Final Office Action filed on Jun. 26, 2006, for U.S. Appl. No. 10/252,127, dated Mar. 21, 2006, 6 pages.
Final Office Action received for U.S. Appl. No. 10/252,127, dated Oct. 6, 2006, 10 pages.
Response to Final Office Action filed on Dec. 11, 2006 for U.S. Appl. No. 10/252,127, dated Oct. 6, 2006, 15 pages.
Advisory Action received for U.S. Appl. No. 10/252,127 dated Jan. 10, 2007, 3 pages.
Non-Final Office Action received for U.S. Appl. No. 10/252,127, dated Jul. 11, 2007, 10 pages.
Response to Non-Final Office Action filed on Oct. 15, 2007, for U.S. Appl. No. 10/252,127, dated Jul. 11, 2007, 15 pages.
Final Office Action received for U.S. Appl. No. 10/252,127, dated Jan. 11, 2008, 11 pages.
Response to Final Office Action filed on Mar. 31, 2008 for U.S. Appl. No. 10/252,127, dated Jan. 11, 2008, 16 pages.
Pre-Appeal Brief Request for U.S. Appl. No. 10/252,127, filed on Apr. 14, 2008, 5 pages.
Advisory Action received for U.S. Appl. No. 10/252,127, dated May 1, 2008, 3 pages.
Decision on Pre-Appeal Brief Request received for U.S. Appl. No. 10/252,127, mailed on May 12, 2008, 2 pages.
Response to Final Office Action filed on Jun. 12, 2008, for U.S. Appl. No. 10/252,127, dated Jan. 11, 2008, 16 pages.
Final Office Action received for U.S. Appl. No. 10/252,127, dated Sep. 4, 2008, 12 pages.
Response to Final Office Action filed on Nov. 4, 2008, for U.S. Appl. No. 10/252,127, dated Sep. 4, 2008, 22 pages.
Advisory Action received for U.S. Appl. No. 10/252,127 dated Dec. 12, 2008, 3 pages.
Pre-Appeal Brief Request filed on Jan. 5, 2009, for U.S. Appl. No. 10/252,127, 5 pages.
Decision on Pre-Appeal Brief Request for U.S. Appl. No. 10/252,127, mailed on Feb. 11, 2009, 2 pages.
Appeal Brief for U.S. Appl. No. 10/252,127, filed on Mar. 11, 2009, 27 pages.
Non-Final Office Action received for U.S. Appl. No. 10/252,127, dated Jun. 26, 2009, 14 pages.
Response to Non-Final Office Action filed on Sep. 28, 2009, for U.S. Appl. No. 10/252,127, dated Jun. 26, 2009, 16 pages.
Final Office Action received for U.S. Appl. No. 10/252,127, dated Jan. 7, 2010, 11 pages.
Response to Final Office Action filed on Mar. 8, 2010, for U.S. Appl. No. 10/252,127, dated Jan. 7, 2010, 17 pages.
Decision on Pre-Appeal Brief Request received for U.S. Appl. No. 10/252,127, mailed on May 14, 2010, 2 pages.
Notice of Allowance received for U.S. Appl. No. 10/252,127, dated Mar. 18, 2011, 16 pages.
Non-Final Office Action received for U.S. Appl. No. 10/252,129, dated Aug. 18, 2006, 12 pages.
Response to Non-Final Office Action filed on Oct. 10, 2006, for U.S. Appl. No. 10/252,129, dated Aug. 18, 2006, 15 pages.
Final Office Action received for U.S. Appl. No. 10/252,129, dated Dec. 27, 2006, 12 pages.
Response to Final Office Action filed on Mar. 2, 2007, for U.S. Appl. No. 10/252,129, dated Dec. 27, 2006, 15 pages.
Advisory Action received for U.S. Appl. No. 10/252,129, dated Mar. 13, 2007, 3 pages.
Non-Final Office Action received for U.S. Appl. No. 10/252,129, dated May 15, 2007, 10 pages.
Response to Non-Final Office Action filed on Aug. 13, 2007, for U.S. Appl. No. 10/252,129, dated May 15, 2007, 16 pages.
Final Office Action received for U.S. Appl. No. 10/252,129, dated Oct. 5, 2007, 10 pages.
Response to Final Office Action filed on Nov. 28, 2007, for U.S. Appl. No. 10/252,129, dated Oct. 5, 2007, 15 pages.
Non-Final Office Action received for U.S. Appl. No. 10/252,129, dated Jan. 14, 2008, 10 pages.
Examiner Initiated Interview Summary received for U.S. Appl. No. 10/252,129, dated Mar. 19, 2008, 2 pages.
Response to Non-Final Office Action filed on Apr. 14, 2008, for U.S. Appl. No. 10/252,129, dated Jan. 14, 2008, 14 pages.
Final Office Action received for U.S. Appl. No. 10/252,129, dated May 29, 2008, 9 pages.
Examiner Initiated Interview Summary received for U.S. Appl. No. 10/252,129, dated Jul. 11, 2008, 2 pages.
Response to Final Office Action filed on Jul. 31, 2008, for U.S. Appl. No. 10/252,129, dated May 29, 2008, 13 pages.
Final Office Action received for U.S. Appl. No. 10/252,129, dated Sep. 15, 2008, 11 pages.
Response to Final Office Action filed on Nov. 11, 2008, for U.S. Appl. No. 10/252,129, dated Sep. 15, 2008, 14 pages.
Advisory Action received for U.S. Appl. No. 10/252,129, dated Nov. 26, 2008, 3 pages.
Response to Final Office Action filed on Dec. 2, 2008, for U.S. Appl. No. 10/252,129, dated Sep. 15, 2008, 14 pages.
Non-Final Office Action received for U.S. Appl. No. 10/252,129, dated Feb. 10, 2009, 11 pages.
Graham, "The Emergence of Linked Fish Markets in Europe", Electronic Markets. vol. 8, No. 2, 1998, pp. 29-32.
Hess et al., "Computerized Loan Organization System: An Industry Case Study of the Electronic Markets Hypothesis" MIS Quarterly, vol. 18(3), Sep. 1994, pp. 251-275.
Klein, "Introduction to Electronic Auctions", Focus Theme, vol. 7, No. 4, 1997, pp. 3-6.
Lee, "Electronic Brokerage and Electronic Auction: The Impact of IT on Market Structures", Proceedings of the Twenty-Ninth Hawaii International Conference on System Sciences, vol. 4, 1996, pp. 397-406.
Lee, "AUCNET: Electronic Intermediary for Used-Car Transactions", Focus Theme, Electronic Markets, vol. 7, No. 4, 1997, pp. 24-28.
Malone et al., "Electronic Markets and Electronic Hierarchies", Communications of the ACM, vol. 30, No. 6, Jun. pp. 484-497.
Massimb, "Electronic Trading, Market Structure and Liquidity", Financial Analysts Journal, 50(1), Jan./Feb. 1994, pp. 39-50.

(56) References Cited

OTHER PUBLICATIONS

Meade, "Visual 360: A Performance Appraisal System That's 'Fun'", HR Magazine, Society for Human Resource Management., Jul. 1999, 3 pages.

Merrill, "GE Capital to Extend Integrator Buying Spree", Computer Reseller News, Jul. 1996, pp. 2 and 32.

Neo, "The Implementation of an Electronic Market for Pig Trading in Singapore", Journal of Strategic Information Systems; vol. 1(5), Dec. 1992, pp. 278-288.

Post et al., "Application of Auctions as a Pricing Mechanism for the Interchange of Electric Power", IEEE Transactions on Power Systems, vol. 10, No. 3, Aug. 1995, pp. 1580-1584.

Preist et al., "Adaptive Agents in a Persistent Shout Double Auction", International Conference on Information and Computation Economies, Proceedings of the first international conference on Information and computation economies, 1998, pp. 11-18.

Reck, "Trading-Process Characteristics of Electronic Auctions", Focus Theme, vol. 7, No. 4, 1997, pp. 17-23.

Resnick, "Reputation Systems", Communications of the ACM, 43(12), Dec. 2000, pp. 45-48.

Rockoff et al., "Design of an Internet-based system for Remote Dutch auctions", Internet Research: Electronic Networking Applications and Policy, vol. 5(4), Jan. 1, 1995, pp. 10-16.

Schmid, "The Development of Electronic Commerce", EM—Electronic Markets, No. 9-10, Oct. 1993, 2 pages.

Schneider et al., "An Introduction to Programming and Problem Solving with Pascal", An Introduction to Programming and Problem Solving with Pascal, Second Edition, John Wiley & Sons, Inc., New York ,1982, 3 pages.

Siegmann, "Nowhere to go But Up", PC Week; vol. 12(42), Ziff-Davis Publishing Company, Oct. 23, 1995, pp. 1-3.

Tjostheim et al., "A Case Study of an On-Line Auction for the World Wide Web", Norwegian Computing Center (NR), [Online]. Retrieved from the Internet: <URL: http://www.nr.no/.about.ingvar/enter98.html>, Accessed Feb. 21, 2005, pp. 1-10.

Turban, "Auctions and Bidding on the Internet: An Assessment", Focus Theme, EM—Electronic Markets, vol. 7, No. 4, 1997, pp. 7-11.

Van et al., "Experiences with Electronic Auctions in the Dutch Flower Industry", Focus Theme, Erasmus University, The Netherlands, 1996, 6 pages.

Warbelow et al., "Aucnet: TV Auction Network System", Harvard Business School Case/Study, HBVR#9-190-001, USA, Jul. 1989, pp. 1-16.

Zwass, "Electronic Commerce: Structures and Issues", International Journal of Electronic Commerce, Fall 1996, vol. 1, No. 1, 1996, pp. 3-23.

"Hello Direct Store Joins eBay Network of Merchants", PR Newswire, New York, NY, May 23, 2002, 1 page.

"Mediappraise Receives National Award for Web-based Technology That Enables Companies to Solve Thorny HR Problem", Business Wire Press Release, Dec. 15, 1998, pp. 1-2.

"Yahoo! Auctions Celebrates One-Year Anniversary; As Online Auction Usage Continues to Grow, Yahoo! Is Quickly Becoming the World Marketplace of the New Millennium", Business Wire, Sep. 14, 1999, 3 pages.

Akin, "Web Retailing Gains Market Muscle as Concerns Fade: Record Season: Increasing number of Sites Catering for Canadian dollars", Financial Post, p04, Dec. 26, 1998, 3 pages.

Business Wire, "Subasta.com, the Premier Online Auction Board for Latin America, Spain, and the Hispanic Sector of the U.S., Has Attracted Over 60,000 Viewers in Less Than Two Months!", Business Wire, Jul. 16, 1999, 2 pages.

Grubbs, "Top 5 Auction Utilities", PC World.com, San Francisco, CA, Dec. 4, 2000,1 page.

M2 Presswire, "United Technologies: UTC's Carrier Corp. teams with FreeMarkets to create largest Asian-based B2B online auction market to date; UTC Division identifies average annual savings of more than 16 percent on electric motors through FreeMarkets B2B eMarketpla", M2 Presswire, Mar. 22, 2000, 2 pages.

Merrill , "GE Capital to Extend Integrator Buying Spree. GE Capital Technology", Computer Reseller News, n691, Jul. 8, 1996, 2 pages.

www.AuctionWatch.com, recovered from www.archive.org on Jun. 8, 2007, Aug. 15, 2000, 30 pages.

"www.thinclient.net.", Accessed via www.archive.org on Feb. 26, 2008, Jun. 22, 2004, 24 pages.

"Blackthorne Products Page", http://web.archive.org/web/19990508065201/www.blackthornesw.com/Bthorne/products, 1999, 2 pages.

"DHL and UPS Offer Country-Specific Services" Transportation and Distribution , vol. 38, Issue 12, Dec. 1997, 18 pages.

"Frequently Asked Questions about Mister Lister", http://pages.ebay.co.uk/help/sellerquide/mr-lister-faq.html, Copyright 1995-2005, 5 pages.

"Google Looking at More Country Specific Domains", Europmedia, Jan. 17, 2002, 1 page.

"Photodisc localizes Internet Presence to Better Serve Global Markets;Adds country-Specific Content and Languages to its Award-Wining Websites", Business Wire, May 27, 1998, 3 pages.

Alice, "eBay's 'Mister Lister' Auction Management Software", Auctionbytes—Update, No. 22, Sep. 24, 2000, 3 pages.

auctionwatch.com et al., AuctionWatch.com's Official Guide to Online Buying and Selling: Professional Tips, Tactics, and Techniques at Your Fingertips., Prima Publishing, Roseville, CA. ISBN 0-7615-2999-3, 2000, 307 pages.

Business Wire, "Bay Builder Releases Major Innovation for Online Wireless Auctions.", Recovered via Dialog Database on Feb. 15, 2008, Mar. 10, 2000, 2 pages.

Dollete, "Thin Clients Pull in Car Customers: Auto Auction Company Eyes Move to Web.(Industry Trend or Event)", Computerworld Recovered via Dialog Database on Feb. 15, 2008, Apr. 5, 1999, 41 pages.

Hansell, "Meg Whitman eBay, Net Survivors", New York Times, May 5, 2002, 5 pages.

Hutchinson, Art, "E-Commerce : Building a Model", Art. Communications Week recovered via Dialog Database on Feb. 15, 2008, Mar. 17, 1997, 57 pages.

Tak et al., "The SIFT Information Dissemination System", ACM Transactions on Database System. vol. 24, Issue 4. ACM Press, Dec. 1999, pp. 529-565.

Wikipedia, "Thin Client",[Online] Retrieved from the Internet: <URL:http://en.wikipedia.org/wiki/Thin.sub.-client>, Feb. 15, 2008, 13 pages.

"Auctionwatch.Com", http://web.archive.org.web/20011217190108/wsacp.auctionwatch.com/login.ht- ml?ret=/my/acp/, 19 pages.

"Auctionwatch", [Online]. Retrieved from the Internet: <URL: http://web.archive.org/web/20000830150100/http://www.auctionwatch.com>—, Aug. 15, 2008, 46 pages.

Examiner Initiated Interview Summary received for U.S. Appl. No. 10/252,129, dated Mar. 31, 2009, 2 pages.

Response to Non-Final Office Action filed on May 11, 2009, for U.S. Appl. No. 10/252,129, dated Feb. 10, 2009, 15 pages.

Final Office Action received for U.S. Appl. No. 10/252,129, dated Jun. 18, 2009, 13 pages.

Response to Final Office Action filed on Aug. 18, 2009, for U.S. Appl. No. 10/252,129, dated Jun. 18, 2009, 19 pages.

Advisory Action received for U.S. Appl. No. 10/252,129, dated Sep. 2, 2009, 3 pages.

Response to Advisory Action filed on Sep. 18, 2009, for U.S. Appl. No. 10/252,129, dated Sep. 2, 2009, 19 pages.

Advisory Action received for U.S. Appl. No. 10/252,129, dated Oct. 6, 2009, 3 pages.

Response to Advisory Action filed on Oct. 19, 2009, for U.S. Appl. No. 10/252,129, dated Oct. 6, 2009, 17 pages.

Non-Final Office Action received for U.S. Appl. No. 10/252,129, dated Nov. 12, 2009, 16 pages.

Response to Non-Final Office Action filed on Feb. 12, 2010, for U.S. Appl. No. 10/252,129, dated Nov. 12, 2009, 18 pages.

Final Office Action received for U.S. Appl. No. 10/252,129, dated Apr. 23, 2010, 18 pages.

Appeal Brief for U.S. Appl. No. 10/252,129, filed on Apr. 25, 2011, 32 pages.

(56) References Cited

OTHER PUBLICATIONS

Examiner's Answer to Appeal Brief received for U.S. Appl. No. 10/252,129, mailed on May 13, 2011, 19 pages.
Appeal Decision received for U.S. Appl. No. 10/252,129, mailed on Mar. 20, 2014, 13 pages.
Response to Final Office Action filed on May 20, 2014, U.S. Appl. No. 10/252,129, dated Apr. 23, 2010, 17 pages.
Non-Final Rejection received for U.S. Appl. No. 10/252,129, dated Sep. 23, 2014, 32 pages.
Applicant Initiated Interview Summary received for U.S. Appl. No. 10/252,129, dated Dec. 1, 2014, 3 pages.
Response to Non-Final Office Action filed on Dec. 17, 2014, for U.S. Appl. No. 10/252,129, dated Sep. 23, 2014, 24 pages.
Final Office Action received for U.S. Appl. No. 10/252,129, dated Apr. 22, 2015, 35 pages.
Response to Final Office Action filed on Jul. 10, 2015, for U.S. Appl. No. 10/252,129, dated Apr. 22, 2015, 21 pages.
Non-Final Office Action received for U.S. Appl. No. 10/252,129, dated Nov. 20, 2015, 35 pages.
Applicant Initiated Interview Summary received for U.S. Appl. No. 10/252,129, dated May 15, 2015, 3 pages.
Preliminary amendment for U.S. Appl. No. 14/268,986, filed on May 5, 2014, 7 pages.
Notice of Non-Compliant Amendment received for U.S. Appl. No. 14/268,986, dated Aug. 12, 2014, 3 pages.
Response to Notice of Non-Compliant Amendment filed on Nov. 12, 2014, for U.S. Appl. No. 14/268,986, dated Aug. 12, 2014, 3 pages.
Non-Final Office Action received for U.S. Appl. No. 14/268,986, dated Jul. 2, 2015, 13 pages.
Response to Non-Final Office Action filed on Oct. 2, 2015, for U.S. Appl. No. 14/268,986, dated Jul. 2, 2015, 10 pages.
Final Office Action received for U.S. Appl. No. 14/268,986, dated Dec. 3, 2015, 13 pages.
Response to Final Office Action filed on Apr. 4, 2016 for U.S. Appl. No. 14/268,986 dated Dec. 3, 2015, 21 pages.
Non-Final Rejection received for U.S. Appl. No. 14/268,986, dated Jun. 17, 2016, 17 pages.
Supplemental Preliminary amendment for U.S. Appl. No. 14/268,986, filed on May 12, 2014, 7 pages.
Preliminary Amendment received for U.S. Appl. No. 14/595,074, Filed on Jan. 19, 2015, 10 pages.
Pre-Interview First Office Action received for U.S. Appl. No. 14/595,074, dated Apr. 2, 2015, 5 pages.
First Action Interview—Office Action received for U.S. Appl. No. 14/595,074, dated Jun. 22, 2015, 4 pages.
Response to First Action Interview—Office Action filed on Aug. 24, 2015 for U.S. Appl. No. 14/595,074, dated Jun. 22, 2015, 18 pages.
Response to Pre-Interview First Office Action filed on Jun. 2, 2015 for U.S. Appl. No. 14/595,074, dated Apr. 2, 2015, 2 pages.
Final Office Action received for U.S. Appl. No. 14/595,074, dated Jan. 14, 2016, 10 pages.
U.S. Appl. No. 09/602,110, filed Jun. 21, 2000, Method and System for Defining and Uploading Multiple Transaction Descriptions From a Client to a Network-Based Transaction Facility.
U.S. Appl. No. 14/595,074, filed Jan. 12, 2015, Method and System for Processing Multiple Transaction Descriptions Received From a Client at a Network-Based Transaction Facility (as amended).
U.S. Appl. No. 10/252,126 U.S. Pat. No. 7,941,348, filed Sep. 20, 2002, Method and System for Scheduling Transaction Listings at a Network-Based Transaction Facility.
U.S. Appl. No. 11/647,728 U.S. Pat. No. 7,895,082, filed Dec. 29, 2006, Method and System for Scheduling Transaction Listings at a Network-Based Transaction Facility.
U.S. Appl. No. 13/080,426 U.S. Pat. No. 8,255,286, filed Apr. 5, 2011, Publishing User Submissions at a Network-Based Facility.
U.S. Appl. No. 10/252,128 U.S. Pat. No. 8,719,041, filed Sep. 20, 2002, Method and System for Customizing a Network-Based Transaction Facility Seller Application.
U.S. Appl. No. 13/489,646 U.S. Pat. No. 8,442,871, filed Jun. 6, 2012, Publishing User Submissions.
U.S. Appl. No. 14/268,986, filed May 2, 2014, Method and System for Customizing a Network-Based Transaction Facility Seller Application.
U.S. Appl. No. 10/252,129, filed Sep. 20, 2002, Method and System for Composing Transaction Listing Descriptions for Use in a Network-Based Transaction Facility.
U.S. Appl. No. 10/252,127 U.S. Pat. No. 8,078,505, filed Sep. 20, 2002, Method and System for Automatically Updating a Seller Application Utilized in a Network-Based Transaction Facility.
U.S. Appl. No. 13/285,916 U.S. Pat. No. 9,092,792, filed Oct. 31, 2011, Customizing an Application.
U.S. Appl. No. 14/790,661, U.S. Pat. No. 10,062,104, filed Jul. 2, 2015, Customizing an Application.
U.S. Appl. No. 16/050,424, filed Jul. 31, 2018, Customizing an Application.
U.S. Appl. No. 11/508,420 U.S. Pat. No. 8,639,782, filed Aug. 23, 2006, Method and System for Sharing Metadata Between Interfaces.
U.S. Appl. No. 14/165,359 U.S. Pat. No. 9,736,269, filed Jan. 27, 2014, Method and System for Sharing Metadata Between Interfaces.

* cited by examiner

SHIPPING OPTIONS INTERFACE

DYNAMIC CONFIGURATION OF MULTI-PLATFORM APPLICATIONS

RELATED APPLICATION

This application is a continuation of U.S. patent application Ser. No. 14/165,359, filed Jan. 27, 2014, which is a continuation of U.S. patent application Ser. No. 11/508,420, filed on Aug. 23, 2006, the benefit of priority of which is claimed hereby, and of which is incorporated by reference herein in its entirety.

FIELD

This application relates to a method and system for sharing metadata between interfaces, and specifically sharing metadata between a client interface and a web interface.

BACKGROUND

Network applications are commonly distributed utilizing two different approaches, a client application and a web application. For example, a service or product provider (hereinafter, provider) operating over a network (e.g., the Internet) may utilize a client application running on a client device and a web server serving web pages to a client web application to exchange various types of data, such as transaction data or user configuration data.

In the first approach, a client application is created, or hard coded, in a programming language such as C++ and then offered to users as a download via a network, or distributed by another means such as compact disk (CD), etc. Once downloaded and/or installed, the user may interact with the client application in communication with the provider's server to exchange data. As with most computer applications for users, the client application is centered on a user interface that provides functionality and displays data generated and communicated by the provider as well as data generated by the user, which may be uploaded to the provider's server.

In order to provide a consistent user experience for the user of the client application and the user of a web application, the provider has to maintain and release new versions of each application whenever a change occurs. Consequently, a provider may incur significant costs in time and resources to ensure a new client application is generated each time a change is made to the web application and vice versa.

BRIEF DESCRIPTION OF DRAWINGS

The present embodiments are illustrated by way of example and not limitation in the figures of the accompanying drawings, in which like references indicate similar elements and in which:

FIG. 2B illustrates an example embodiment of a user interface (UI) screenshot that may be associated with a programmatic framework.

FIG. 2C illustrates an example embodiment of a user interface (UI) screenshot that may be associated with or activated from another UI within the programmatic framework.

DETAILED DESCRIPTION

In the following description, for purposes of explanation, numerous specific details are set forth in order to provide a thorough understanding of the various embodiments herein. It will be evident, however, to one skilled in the art that these and other embodiments may be practiced without these specific details.

In one embodiment, a networked system includes a web application and distributed client applications configured to give their respective users a similar user experience on each application type. To facilitate providing a similar user experience, a common framework (e.g., user interface and supporting logic) may be used in each application such that a single file containing configuration data (e.g., operational rules, framework data, UI data, etc.) may be communicated to each application and utilized by each framework to create a substantially similar user experience with respect to the user interface and its underlying functionality.

Figure 1:
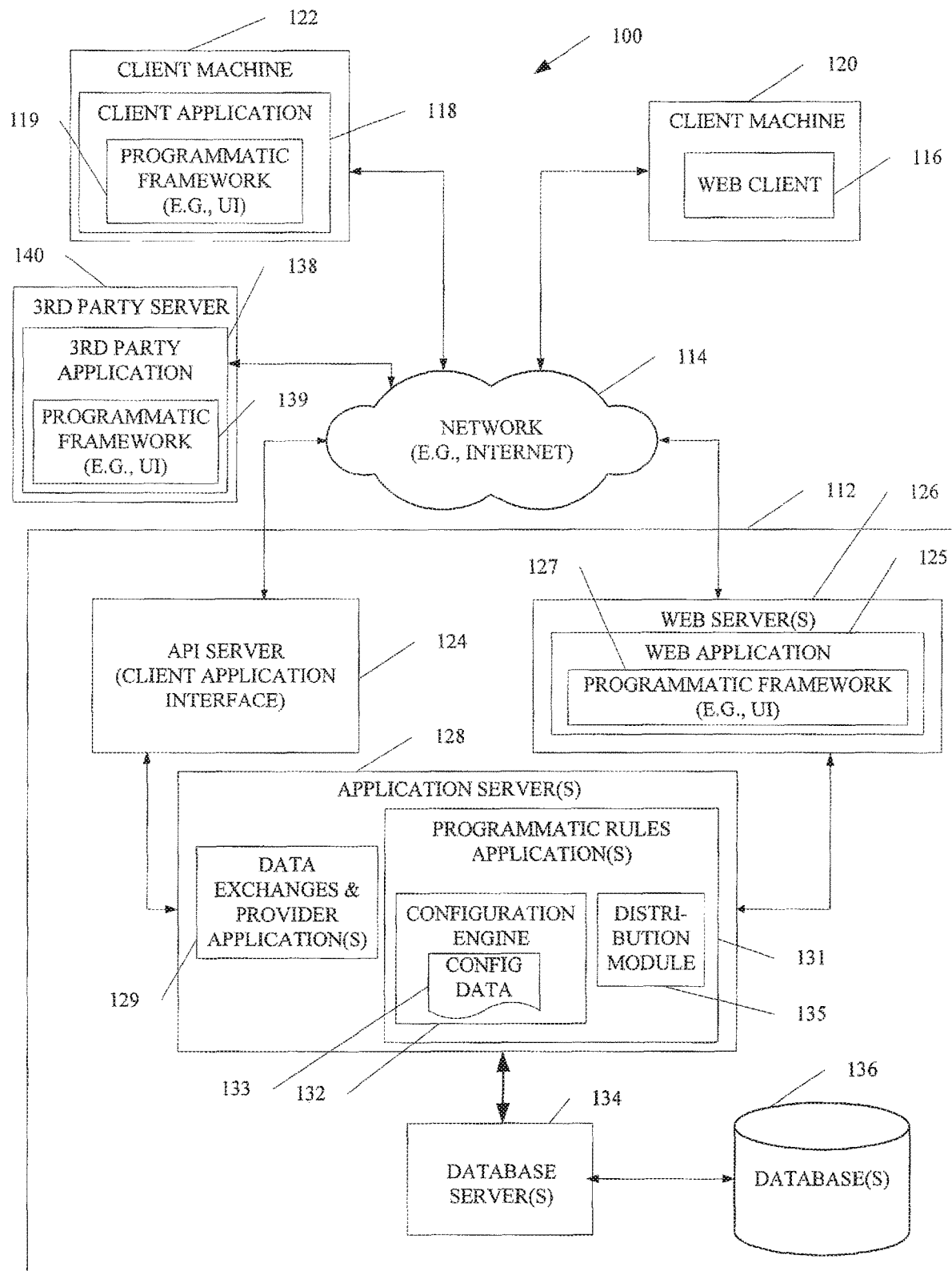
FIG. 1 is a network diagram of an example embodiment depicting a data exchange system having a client-server architecture configured for exchanging data over a network.

These example embodiments allow for a network system to leverage the advantages of the client application and the web application. For example, a client application has an advantage of being flexible, such that a user may interact with the client application offline. On the other hand, a web application dynamically provides user interface data to one or more web clients that can be accessed by any machine on a network (e.g., Internet) where the machine includes a web application, such as a common web browser. The dynamic flow of data has a few advantages. For example, any change to the user interface may be implemented on the provider's web server, which seamlessly shows up the next time the user refreshes or enters the provider's link and downloads the new page data. Although this approach provides a lot of flexibility with respect to updating functionality, it does not allow for offline activities since the application's functionality is derived from data received dynamically from the provider's web server, FIG. 1 is a network diagram depicting a data exchange system 100, according to one embodiment, having a client-server architecture configured for exchanging data over a network. For example, the data exchange system 100 may be a trading/commerce system where clients may communicate and exchange data with the trading/commerce system, the data may include product listings, auction bids, feedback, etc.

A data exchange platform, in an example form of a network-based provider 112, provides server-side functionality, via a network 114 (e.g., the Internet) to one or more clients. The one or more clients may include users that may utilize the data exchange system 100, and more specifically the network-based provider 112, to facilitate data exchanges, such as various types of transactions (e.g., purchases, listings, feedback, etc.). These data exchanges may be dependent upon user selected functions available through a client/ user interface (UI) (e.g., see FIG. 2B). The UI may be associated with a client machine, such as a client machine 120 utilizing a web client 116 served from a web application 125 operating on a web server 126. The UI may also be associated with a client machine 122 utilizing a client application 118, or a third party server 140 hosting a third party application 138.

The web server 126, the client application 118, and the third party application 138 may each host a similar programmatic framework (e.g., programmatic frameworks 119, 127, 139) to provide a user of the client machine 122, third party server 140 or the client machine 120 a similar experience in functionality for a given transaction. For example, this functionality may include similarities of a particular look and feel of a user interface (UI) (e.g., what and how data is displayed on the UI, see FIG. 2B), application functionality based on validation rules and/or rolls for the user, programmatic logic to determine a sequence of actions or displays, and dependency rules to determine what is displayed based on user interaction. It can be appreciated that in other embodiments there may be a multitude of web servers 126 operating on one or more network-based providers 112, but for simplicity a single network-based providers 112 and a single web server 126 is discussed hereinafter.

In various embodiments, the third party server 140 may or may not include the third party application 138. The third party application 138 may be remote from the third party server 140 but still be in communication via the network 114. In one embodiment, the third party application 138 may only include a subset of functionality (e.g., look and feel of the UI, etc.) that may be associated with the client application 118 and the web application 125. This may provide a programmer or administrator of the third party application 138 with the flexibility to pick and choose (if not mandated by the network-based provider 112) for its programmatic framework 139 which functions it will have in common with the programmatic frameworks 119, 127 of the client application 118 and the web application 125, respectively.

Turning specifically to the network-based provider 112, an application program interface (API) server 124 and a web server 126 are coupled to one or more application servers 128. The application servers 128 host one or more data exchange and provider applications 129, and one or more programmatic rules application(s) 131. The application servers 128 are, in turn, shown to be coupled to one or more database server(s) 134 that facilitate access to one or more database(s) 136.

The programmatic rules application(s) 131 may include a configuration engine 132 that may process configuration data 133 and a distribution module 135 to distribute the configuration data 133 to the client application 118, the web application 125 of the web server 126, and the third party application 138. The configuration data 133 may include but is not limited to framework data, programmatic logic, and validation rules. Once received, the client application 118, the web application 125, and the third party application 138 may utilize the configuration data 133 within their respective programmatic frameworks 119, 127, 139. This may include implementing programmatic changes to existing, or addition of functionality, to the client applications 118, the third party application 138, and the programmatic components served from the web application 125 to the web client 116, without having to create a new client application 118, a new third party application 138 and a new web application 125. In this example embodiment, the client application 118, the third party application 138, and the web application 125 may be updated by a single file or electronic document, such as the configuration data 133. Although the configuration data 133 is discussed herein as being distributed via a network, in other embodiments the configuration data 133 may be distributed via other distribution media, such as compact disk, floppy disk, flash media, etc. A more detailed discussion of embodiments associated with the configuration data 133 is discussed below.

The network-based provider 112 may include functionality that periodically checks (e.g., via polling) the version of the configuration data 133 being implemented by the client application 118, the web application 125, and the third party application 138. In cases where a particular application is out of date, the network-based provider 112 may push the new configuration data to the out of date application in another embodiment, the applications may request, automatically or by user interaction, a configuration data version status. If out of date, the applications may then request the updated version of the configuration data 133.

The web client 116 may access the various data exchange and provider applications 129 and programmatic rules application(s) 131 via the web interface supported by the web server 126. Similarly, the client application 118 may access the various services and functions provided by the data exchange and provider applications 129 and the programmatic rules application(s) 131 via the programmatic interface provided by the API server 124. The client application 118 may, for example, be a seller application (e.g., the TurboLister® application developed by eBay Inc., of San Jose, Calif.) to enable sellers to author and manage listings at the network-based provider 112 in an off-line manner, and to perform batch-mode communications between the client application 118 and the network-based provider 112.

As mentioned above, FIG. 1 also illustrates the third party application 138, executing on the third party server machine 140, as having programmatic access to the network-based provider 112 via the programmatic interface provided by the API server 124. For example, the third party application 138 may utilize information retrieved from the network-based provider 112 to support one or more features or functions on a website hosted by the third party. The third party website may, for example, provide one or more promotional, marketplace or payment functions that are supported by the relevant applications of the network-based provider 112.

For simplicity, the discussion hereafter will focus on client application 118 and the web application 125. It can be appreciated the third party application 138 may have substantially similar functionality and application to that of the client application 118 with respect to the various embodiments described herein.

Figure 2A:
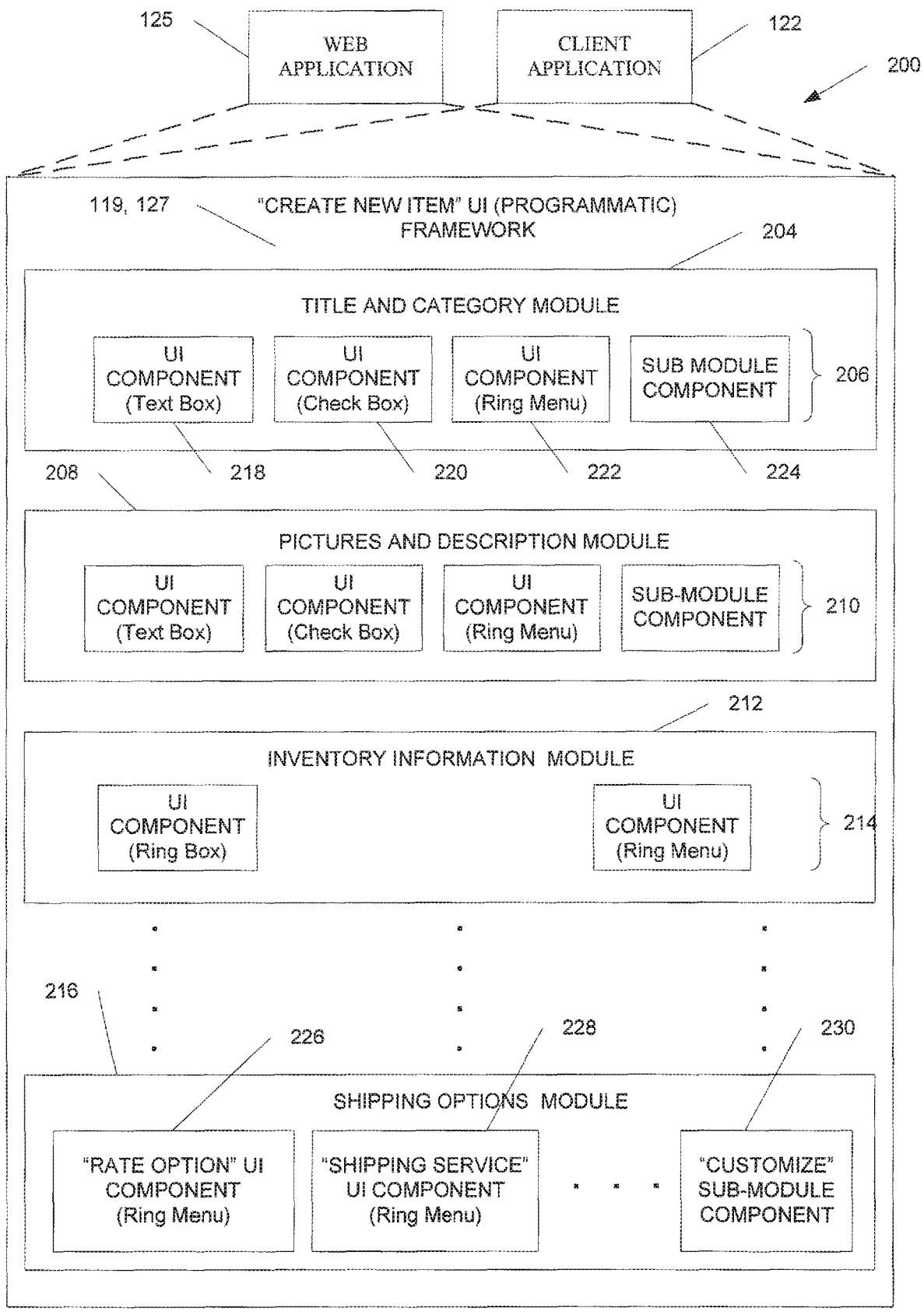
FIG. 2A illustrates modules in example embodiment of programmatic frameworks associated with a client application and a web application.

FIG. 2A illustrates modules, according to an example embodiment, of the programmatic frameworks 119, 127 associated with the client application 122 and the web application 125, respectively. The programmatic frameworks 119, 127 (e.g., a UI framework) may include various types of framework data, which includes but is not limited to modules, such as a title and category module 204, a pictures and description module 208, an inventory information module 212, and a shipping options module 216. These modules are for example purposes only, and it can be appreciated that, in various embodiments, the number and type of modules included in a programmatic framework (e.g., programmatic frameworks 119, 127) may be dependent upon the functions associated with an application of the network-based provider 112. In various embodiments, when these modules are utilized within their respective frameworks, they may create and provide various programmatic responses. These programmatic responses may include input/output functions and displays associated with a user interface, such as a graphical user interface associated with the client machines 120, 122.

The title and category module 204, the pictures and description module 208, and the inventory information module 212, according to one embodiment, includes various component sets such as component sets 206, 210, 214, respectively. For example, the component set 206 of the title and category module 204 include a UI component 218 in the form of a text box, a UI component 220 in the form of a check box, a UI component 222 in the form of a ring menu, and a sub-module component 224. For simplicity, the component set 210 and the component set 214 include similar components as component set 206. However, it can be appreciated that in various embodiments, the pictures and description module 208 and the inventory information module 212 may have less, additional, or different components within their respective component sets (e.g., component sets 210, 214).

The shipping options module 216 includes specific components that will be discussed further with reference to FIG. 2B. Specifically, these components are a rate option UI component 226, a shipping service UI component 228, and a customize sub-module component 230.

In one embodiment, a multitude of category modules and their respective UI components are included in the programmatic frameworks 119, 127 upon distribution of their respective applications, the client application 118 and the web application 125. The rules (e.g., configuration data 133) received and processed by the client application 118 and the web application 125 may determine which, if not all, of the multitude of category modules are activated and more specifically which, if not all, of the components of the component sets are used and how they are displayed and executed on the client machines (e.g., client machine 120, 122). This is how, for example, a single set of rules (e.g., configuration data 133) may be communicated to two independent applications (e.g., the client application 118 and the web application 125) such that each application maintains substantially similar functionality with respect to each other.

Additionally, in other embodiments, new components may be inserted into one or more existing modules of each framework. For example, the configuration data 133 may provide instruction to copy or duplicate an existing UI component from an existing module and inserted into the existing or another module. The configuration data 133 may then further define the new UI component's attributes and functionality as described herein for updating existing modules and components. In another embodiment, a new UI component may be received at the client application 118 and web application 125 for addition to the programmatic frameworks 119, 127 via the configuration data 133. In yet another embodiment, a UI component may be a generic UI component stored by the client application on the host machine and included and defined in the programmatic framework as determined by the configuration data 133.

Figures 2B, 2C:
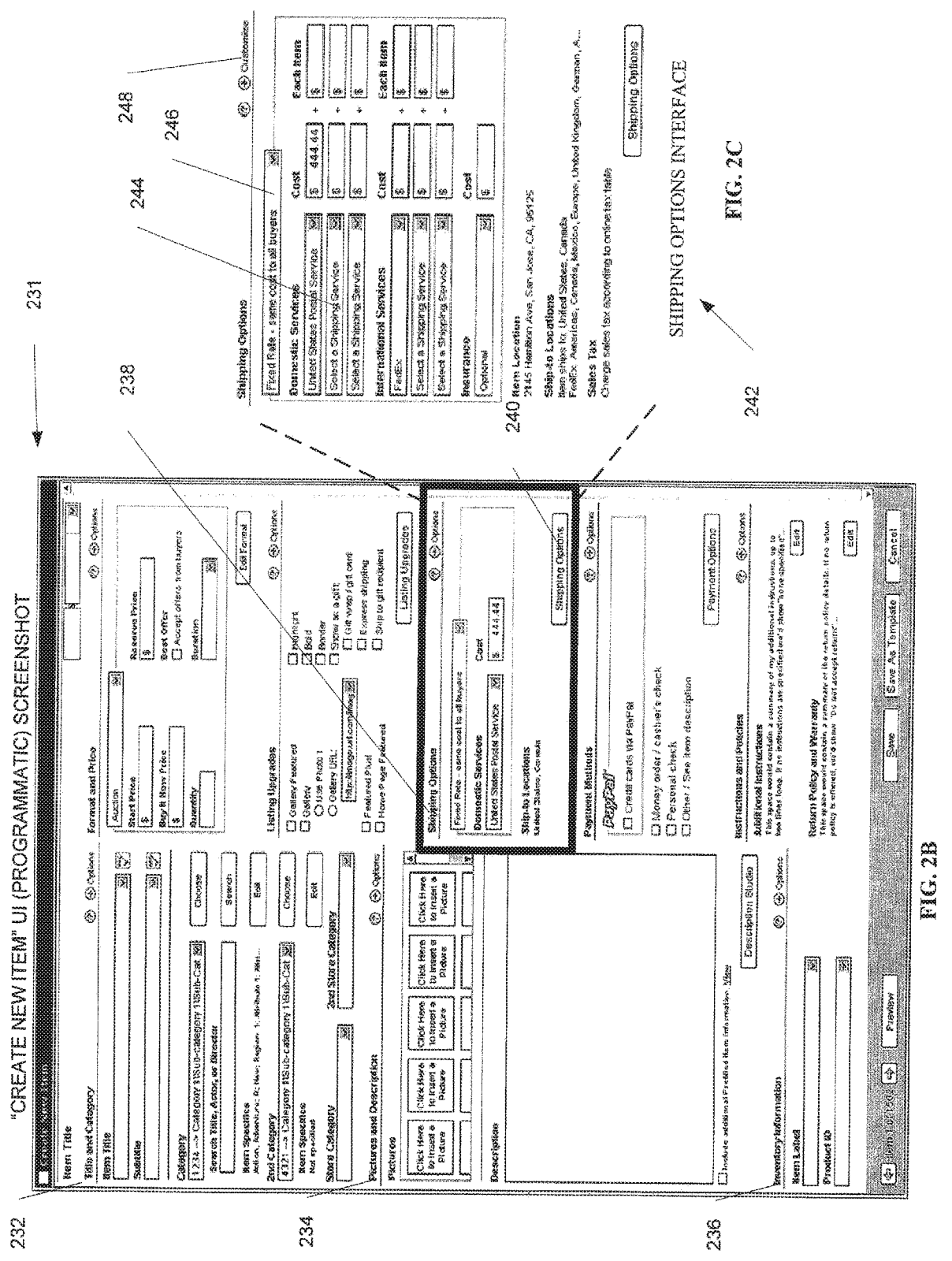

FIG. 2B illustrates a UT screenshot 231 that may be associated with the programmatic frameworks 119, 127, according to an example embodiment. The UI screenshot 231 may include a title and category section 232 that may be associated with the title and category module 204 and its component set 206. Similarly, the UI screenshot 231 may include a pictures and description interface 234, and an inventory information interface 236, which may be associated with the pictures and description module 208 and the inventory information module 212.

Although shown here as identical, the UI screenshot 231 may have different look and feel between the two programmatic frameworks 119, 127 but still include substantially similar modules and components sets such that a single set of rules (e.g., configuration data 133) may be used to make programmatic changes in each application. For example, the title and category section 232 in the programmatic framework 119 and the programmatic framework 127 may include the UI component 222, which is a ring menu, and a UI component configured as a selectable text box (not shown), each configurable to perform similar functions but using a different interface. Although each of the components are common to each programmatic frameworks 119, 127, the set of rules (e.g., the configuration data 133) may be used to activate the ring menu UI component for the programmatic framework 119 and the selectable textbox UI component for the programmatic framework 127.

In one embodiment the UI screenshot 231 includes a shipping options interface 238. The shipping options interface 238 may be associated with the shipping options module 216 of FIG. 2A. The shipping options interface 238 includes a shipping options button 240. In one embodiment, the shipping options button 240 may activate or cause to display a shipping options interface 242 as illustrated in FIG. 2C. The shipping options interface 242 corresponds with the shipping options module 216 and its associated components. For example, a select a shipping service ring menu 244 corresponds to the shipping service UI component 228 of the shipping options module 216. Similarly, a fixed rate ring menu 246 may be associated with the rate option UI component 226 of the shipping options module 216. Additionally, a customize button 248 may be associated with the customize sub-module component 230 of the shipping options module 216. In one embodiment, the customize sub-module component 230 when activated by the customize button 248 generates a new interface which may include additional components, such as UI components for ring menus, check boxes, text boxes etc.

Figure 3:
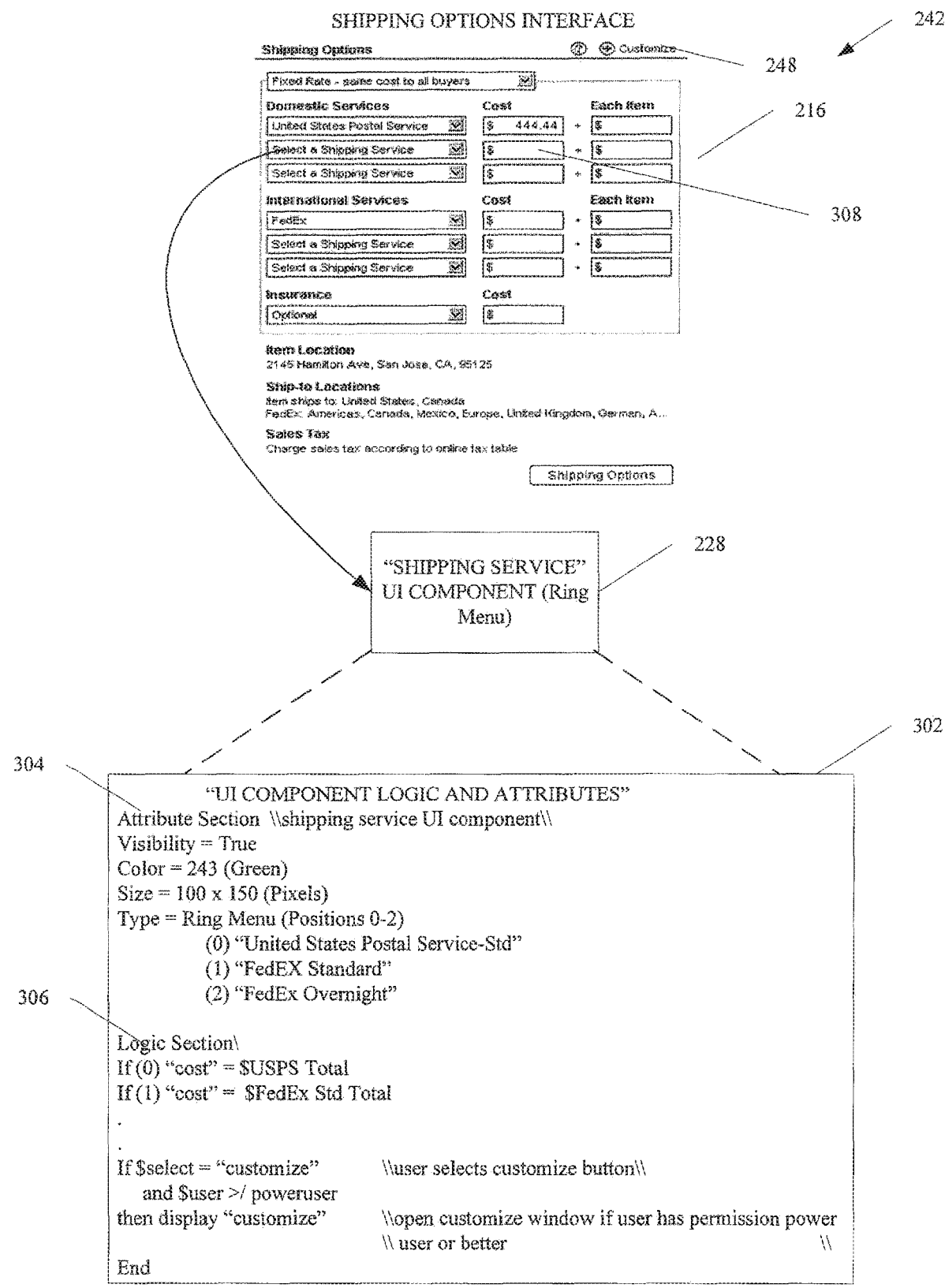
FIG. 3 illustrates an example embodiment of an options interface and its relationship to a UI component.

FIG. 3 illustrates an example embodiment of the shipping options interface 242 and its relationship to the shipping service UI component 228. The shipping service UI component 228 includes underlying programmatic logic and attributes, such as UI component logic and attributes 302. For example, the UI component logic and attributes 302 may include operational parameters that when executed within the shipping service UI component 228, cause a shipping options interface 242 to display a particular control that may be interacted with by a user. In this example, the control may be the select the shipping service ring menu 244 and may have attributes such as visibility, color, size, and type (e.g., ring menu). As illustrated in the UI component and logic attributes 302, the type is a ring menu including three positions each corresponding to a selectable shipping service (e.g., FedEx® overnight).

Additionally, the UI component logic and attributes 302 may include a logic section 306. The logic section 306 may include programmatic logic or rules for how the programmatic frameworks 119, 127 performs with respect to what a user may see and do on the client application 122 and the web client 116. For example, as shown in logic section 306, if the ring menu position of the select a shipping service ring menu 244 has a position value of zero, then a cost field 308 of the shipping options interface 242 may be updated with the United States Postal Service total representing the cost to ship a particular item.

In various other embodiments, the logic section 306 may include logic such that when a particular UI component is activated (e.g., ring menu position 1 selected) another module or sub-module within the programmatic frameworks 119, 127 is activated resulting in an underlying action and/or the display of a new user interface or additional user interface components within an existing interface, such as shipping options interface 242. In another example, the customize button of shipping options interface 242 may be selected by a user. Codified logic within the logic section 306 may determine whether or not a new customize window opens based on the selection of the customize button 248 and the user's (e.g., of client machine 122) access privileges based on a login and access criteria. It can be appreciated that in various embodiments many types of attributes and logic may be applied to the UI component logic and attributes 302, and what is illustrated here with respect to FIG. 3 and its accompanying description is by example only.

Figure 4:
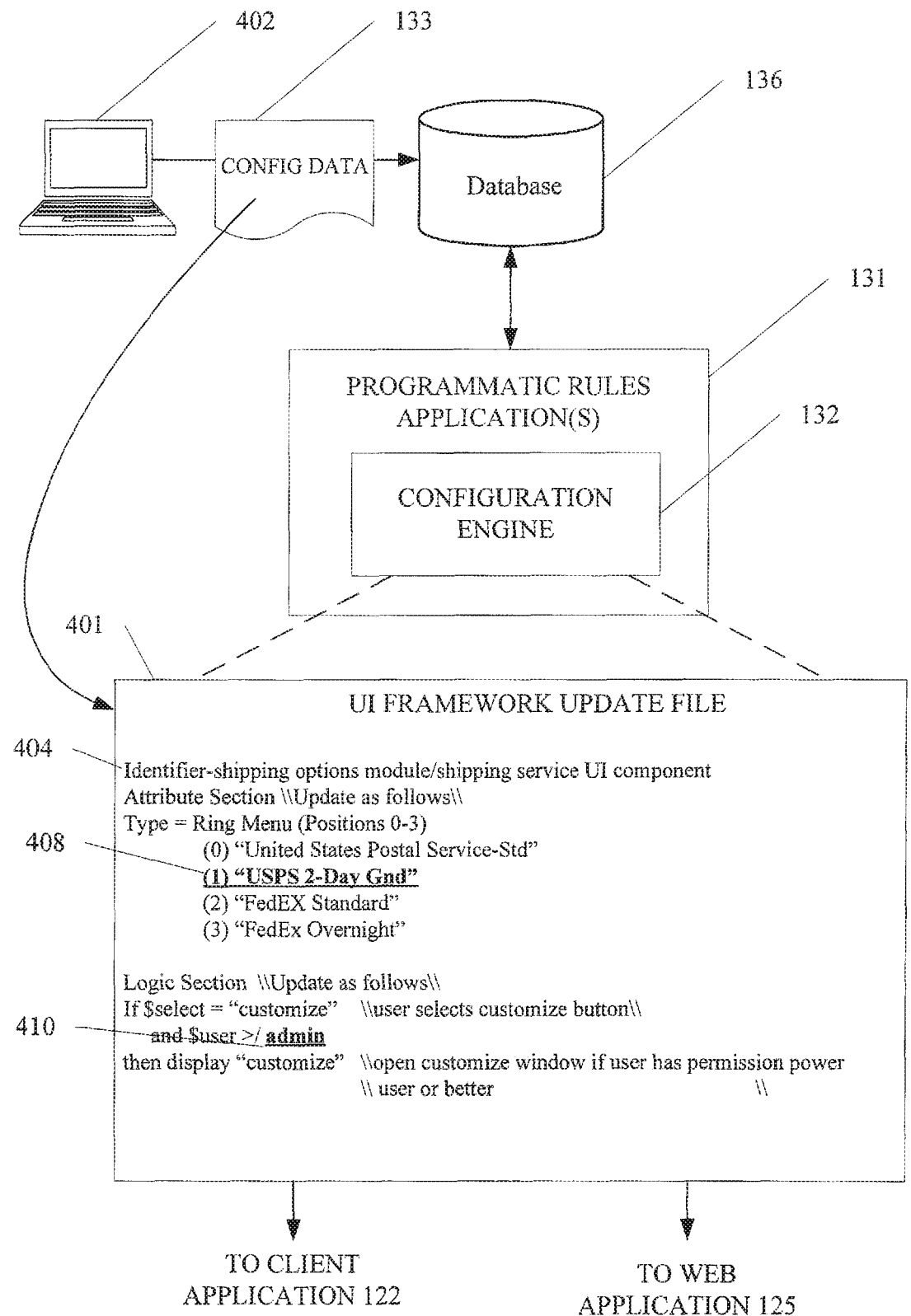
FIG. 4 illustrates an example embodiment of configuration data that may be distributed to a web application and a client application to update their respective UI frameworks.

FIG. 4 illustrates an example embodiment of the configuration data 133 that may be distributed to the web application 125 and the client application 118 to update their respective UI frameworks 127, 119. A user of computer system 402 may generate the configuration data 133 according to a programmatic language utilized by the programmatic framework 127, 119 of the web application 125 and the client application 118. For example, the programmatic framework 127, 119 may be implemented in an eXtensible Markup Language (XML) and the configuration data 133 may be metadata configured and recognizable by the components (e.g., shipping service UI component 228) of the modules (e.g., shipping options module 216) of the programmatic frameworks 119, 127. It can be appreciated in various embodiments, that the programmatic frameworks 119, 127 may be created using one of a multitude of programmatic languages such that the configuration data 133 may be utilized to update the functionality of the programmatic frameworks 119, 127 of the client application 122 and the web application 125, respectively.

A user of computer system 402, according to one embodiment, may create the configuration data 133 for distribution to the web application 125 and the client application 118. In one embodiment, the configuration data 133 is stored in the database(s) 136, which then may be accessed by the programmatic rules application(s) 131 via the database server(s) 134. In another embodiment, the computer system 402 is integrated into the network-based provider 112 and may be in direct communication with the programmatic rules application(s) 131. The programmatic rules application(s) 131 may provide the programmatic interface to the computer system 402 for generating the configuration data 133.

In one embodiment, the configuration engine 132 of the programmatic rules application(s) 131 may format the configuration data 133, as generated by computer system 402 and/or retrieve from database(s) 136, into a format usable by the client application 118 and the web application 125 and their respective programmatic frameworks 119 and 127. The configuration data 133 does not require additional formatting and the configuration engine 132 and the programmatic rules application(s) 131 are utilized to distribute the configuration data 133 to the web application 125 and the client application 118. In one embodiment, the configuration data 133 may be distributed as a text file over the network 114 to the client application 118 on the client machine 122 or within an internal network within the network-based provider 112 within communication with the web application 125 within the web server 126. In other embodiments, the configuration data 133 is distributed or communicated to the web application 125 and the client application 118 in one of many types of files known in the art, such as an encrypted file, a binary file, a text file, etc.

A UI framework update file 401 illustrates an example embodiment of the configuration data 133 composed to update a UI component such as the UI component logic and attributes 302 portion of the shipping service UI component 228. In this example, the UI framework update file 401 includes an identifier 404. The identifier 404 may be any string or alphanumeric character or other unique identifier indicating which UI component of which module to update in the programmatic frameworks 119, 127. The purpose of identifier 404 is to ensure the appropriate UI component in the appropriate module is correctly updated. As illustrated here, identifier 404 identifies the shipping options module 216 and the shipping service UI component 228.

The UI framework update file 401 may include updates to the various portions of the UI components, such as updates to the UI component logic and attributes 302 of the shipping service UI component 228. For example, an update 408 illustrates an addition to the ring menu of shipping service UI component 228, and more specifically adds an additional shipping service that may be selected from the ring menu. An update 410 illustrates a change to the logic section 306 of the UI component logic and attributes 302. Specifically, the update 410 changes the permissions required for the customization window to be activated. Because the programmatic framework 119 of the client application 118 and the programmatic framework 127 of the web application 125 are substantially similar and share substantially the same modules the same UI framework update file 401 may be used to update each programmatic framework 119 and 127.

In another embodiment (not shown), and update may include the addition of a new UI component to the programmatic frameworks 119, 127. For example, the UI framework update file 401 may include instructions to add a new UI component from the existing repository associated with the programmatic framework, and attribute values to define the UI component attributes (e.g., UI position of new module, ring menu titles, etc.). The updates and the corresponding file text are only examples of updates to the attributes and logic section of a UI component within a UI (programmatic) framework, and that many variations in programmatic logic and attributes may exist which may be updated according to the methods describes herein.

Figure 5:
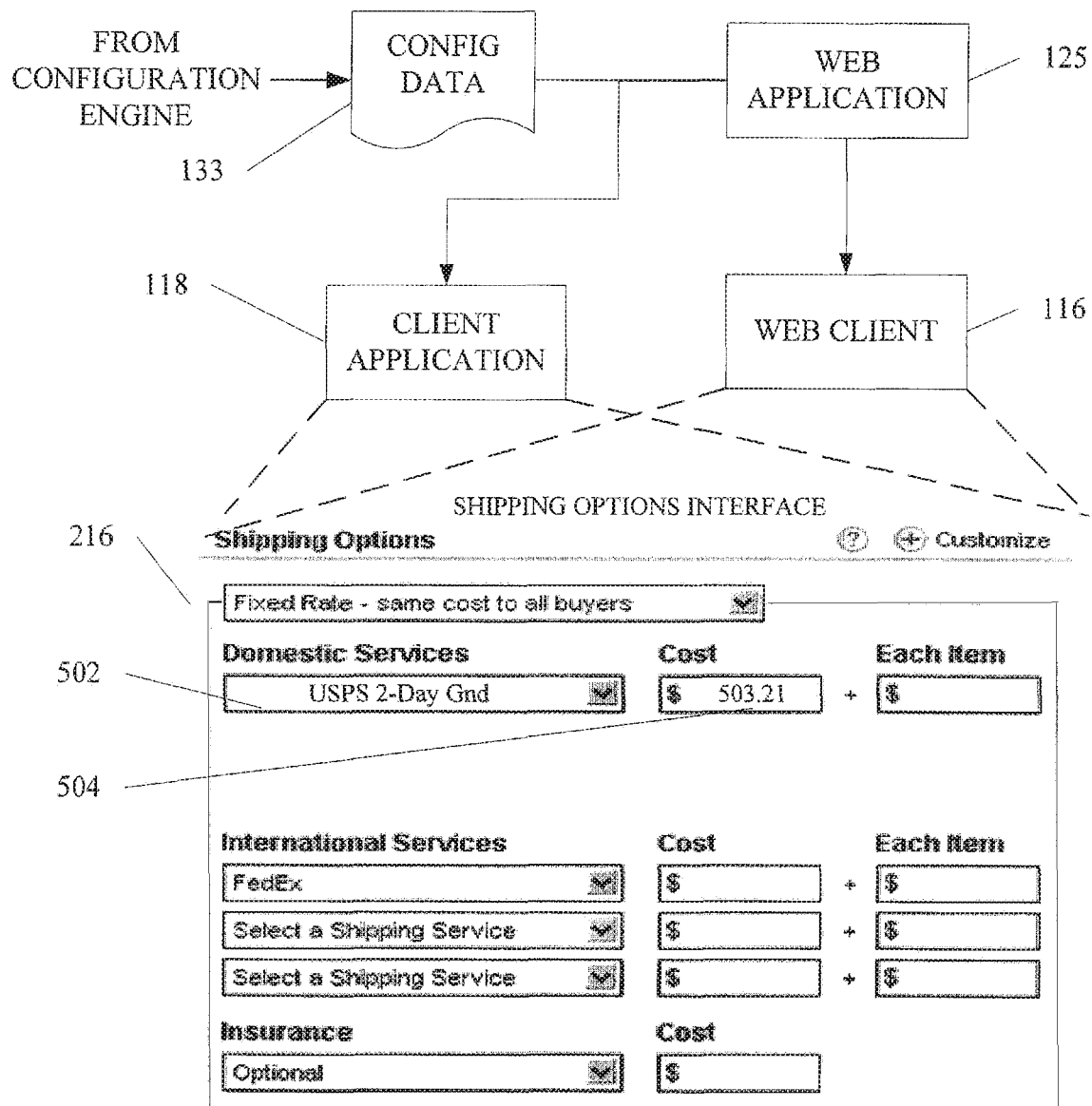
FIG. 5 illustrates an example embodiment of configuration data propagating from a configuration engine to a framework, and specifically a user interface.

FIG. 5 illustrates an example embodiment of the propagation of the configuration data 133, and specifically the communication of the example UI framework update file 401 to the web client 116 and the client application 122. In this example, the UI framework update file 401 is for updating the shipping options interface 242. In various embodiments, all or a portion of the UI framework update file 401 may be shared between the client application 118 and web application 125. In such a manner, particular instructions or data may be targeted to either or both of the web client 116 and the client application 122.

The ring menu 502 of the shipping options interface 242 illustrates the addition of the USPS to the ground option as discussed with reference to the update 408 in FIG. 4. Additionally, the cost field 504 may also be updated to reflect the new ring menu selection. Although not shown, the shipping service UI component 228 may include the necessary programmatic functions to calculate the cost field 504 and may also have to be updated accordingly. In other embodiments, the cost field 504 and its contents are a local or global variable(s) within the programmatic frameworks 119, 127, thus they may be available to other portions of the programmatic frameworks 119, 127 (e.g., a calculations module). These other portions may be in communication with elements and components external to the host client machine 120, 122 to acquire data that may be necessary for calculations, inquiries (user or system) etc. (e.g., obtaining the latest shipping rates from a shipper's web site).

Figure 6A:
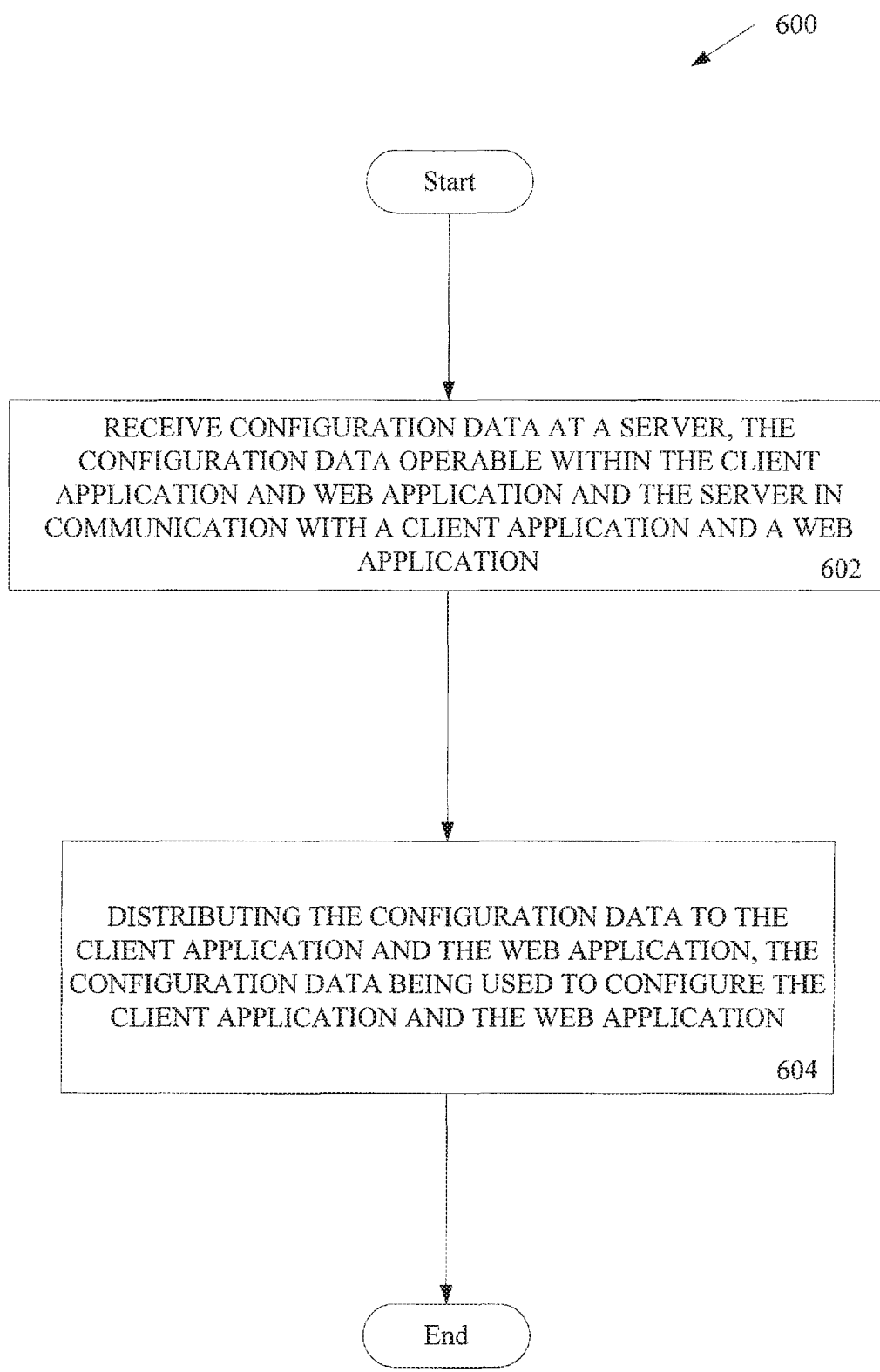
FIG. 6A is a flow chart, according to an example embodiment, illustrating the operations of distributing configuration data to a client application and a web application

FIG. 6A is a flow chart 600, according to an example embodiment, illustrating the operations of distributing the configuration data 133 universal to the client application 118 and the web application 125. At operation 602, the server (e.g., application servers 128) receives the configuration data operable within the client application 118 and web application 125. In one embodiment, the server is communicatively coupled to the client application 118 and the web application 125 via the network 114 (e.g., Internet, intranet, etc.). In another embodiment to distribute the configuration data 133, the client machine 122 hosting the client application 118 (or other networked device, see description with reference to FIG. 7) may also include applications (e.g., the programmatic rules application(s) 131), which may operate in the capacity of a peer machine in a peer-to-peer (or distributed) network environment, to provide a source for the distribution of the configuration data 133.

At operation 604, the server distributes the configuration data 133 to the client application 118 and the web application 125. The configuration data 133 may then be used to configure the client application 118 and the web application 125. In one embodiment, the server retrieves the configuration data 133 from a database (e.g., database(s) 136 via database server(s) 134). In another embodiment, the configuration data 133 is generated by a user via a programmatic interface and distributed to the client application 118 and the web application 125 prior to being stored in the database.

Figure 6B:
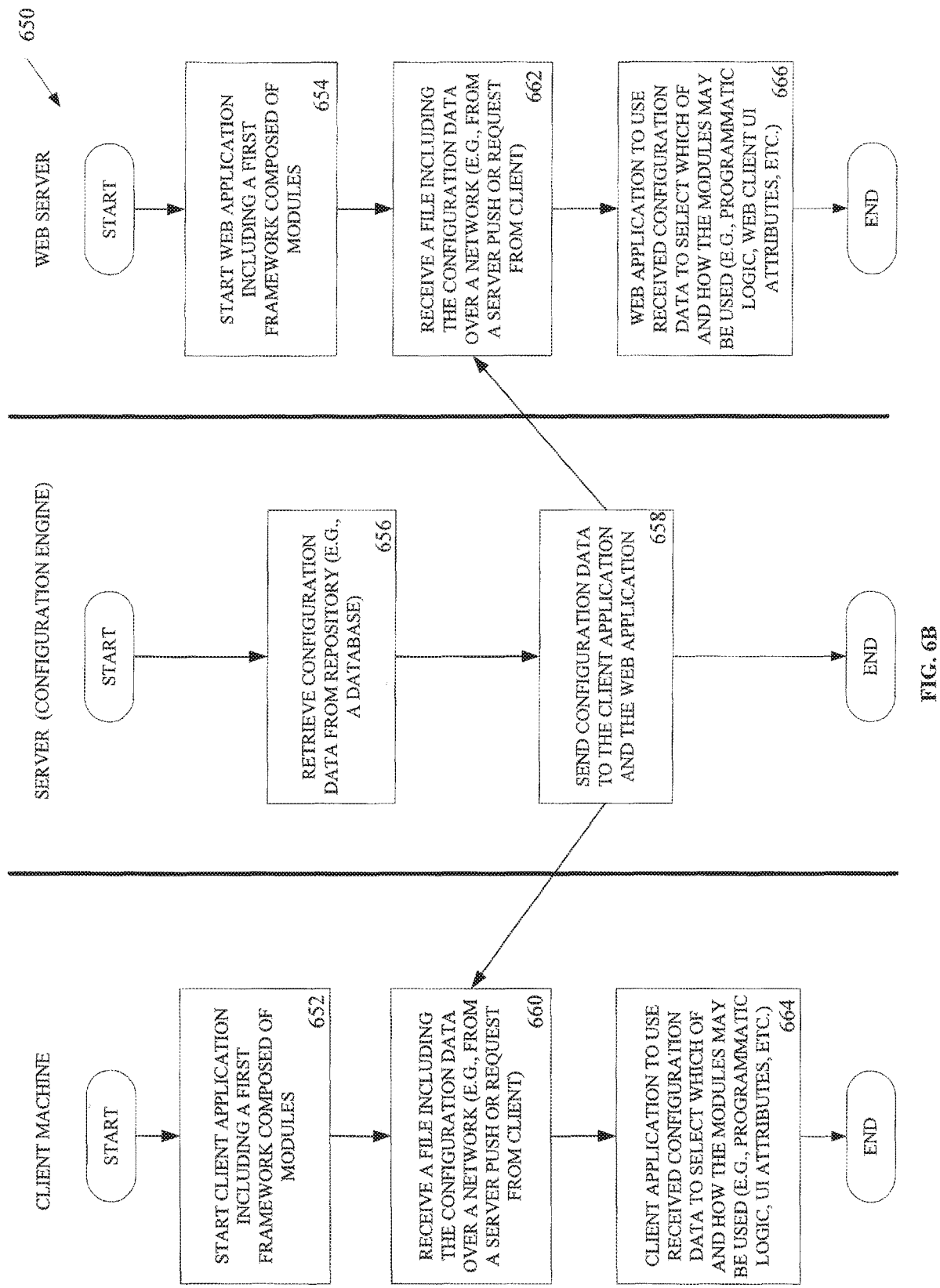
FIG. 6B is a flow chart, according to an example embodiment, illustrating the distribution and use of the configuration data by a client application and a web application.

FIG. 6B is a flow chart 650, according to an example embodiment, illustrating the distribution and use of the configuration data 133 by the client application 118 and the web application 125. At operations 652 and 654, the client application 118 and the web application 125 are started and require updated configuration data. The client application 118 and the web application 125 may include a first framework and a second framework, respectively. Each framework is further composed of modules and components which may be executed, in an example embodiment, according to the rules and logic provided by the updatable configuration data (e.g., configuration data 133).

Based upon a request to the server for updated configuration data or a command to push the configuration data to the applications, at operation 656, the server retrieves the configuration data 133 from a repository, such as database(s) 136. At operation 658, the server sends (e.g., via the network 114) the configuration data 133 to the client application 118 and the web application 125. As discussed above, other embodiments may also include communicating the configuration data 133 to the third party application 138.

At operations 660 and 662, the client application 118 and the web application 125 receive the configuration data 133. In one embodiment, the configuration data 133 is received over the network 114 as a file recognizable by each application as a configuration data file. The client application 118 and the web application 125 may then use the received configuration data 133 to select which of and how the modules may be used to generate the desired user interface, including the functionality behind the user interface operations. As discussed above, this is done in part through implementing programmatic logic, setting of UI attributes, etc., via the configuration data 133 and the respective frameworks of each application.

Figure 7:
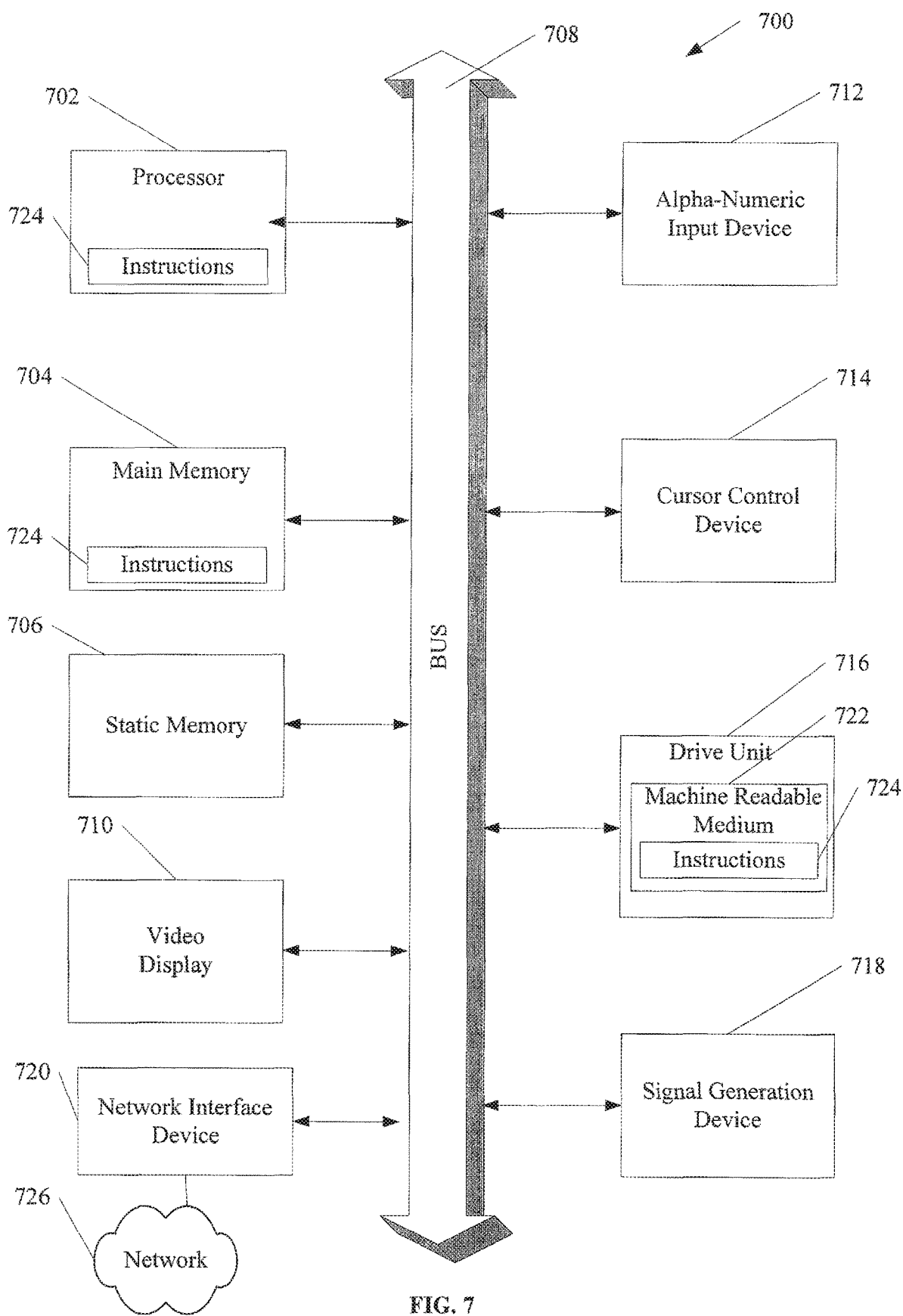
FIG. 7 shows a diagrammatic representation of a machine in the example form of a computer system within which a set of instructions, for causing the machine to perform any one or more of the methodologies discussed herein, may be executed.

FIG. 7 shows a diagrammatic representation of machine in the example form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term machine shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712. (e.g., a keyboard), a user interface (UI) navigation device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 via the network interface device 720 utilizing any one of a number of well-known transfer protocols (e.g., HTTP).

While the machine-readable medium 722 is shown in an example embodiment to be a single medium, the term machine-readable medium should be taken to include a single medium or multiple media (e.g., a centralized or distributed database, and/or associated caches and servers) that store the one or more sets of instructions. The term machine-readable medium shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term machine-readable medium shall accordingly be taken to include, but not be limited to, solid-state memories, optical and magnetic media, and carrier wave signals.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computer-implemented method, comprising:
receiving configuration data at a first computing device associated with a first operating system;
activating a first user interface component of a first programmatic module within a first application responsive to receiving the configuration data;
changing an appearance of the first application of the first computing device responsive to the activating the first user interface component, the changing the appearance of the first application being without the first computing device changing a first executable file associated with the first application; and
generating a first programmatic response responsive to receiving a selection of the first user interface component of the first programmatic module of the first application, the first programmatic response including processing input/output, respectively, at the first computing device, the processing the input/output is associated with a graphical user interface.

2. The computer-implemented method of claim 1, further comprising activating or deactivating the first programmatic module within the first application responsive to receiving the configuration data.

3. The computer-implemented method of claim 1, further comprising deactivating the first user interface component of the first programmatic module within the first application.

4. The computer-implemented method of claim 1, wherein the first user interface component includes a text box that is enabled for selection, and wherein the receiving the selection of the first user interface component includes receiving a selection of the text box being presented on the graphical user interface, and wherein the first programmatic response to the receiving the selection includes processing values being communicated as input/output via the text box via the graphical user interface via the first computing device, and wherein the values include alphanumeric values.

5. The computer-implemented method of claim 1, further comprising:
validating a first input received by the first computing device based on the configuration data.

6. The computer-implemented method of claim 1, further comprising:
sending first login information, the sending being from the first computing device; and
receiving first privileged information at the first computing device responsive to the sending the first login information.

7. The computer-implemented method of claim 1, further comprising:
sending a request for a configuration data version status of the first application; and
receiving the configuration data version status of the first application.

8. The computer-implemented method of claim 7, further comprising:
identifying the configuration data version status of the first application is out-of-date; and
sending a request for additional configuration data responsive to the identification of the first configuration data version status of the first application being out-of-date.

9. The computer-implemented method of claim 1, wherein the first computing device is a web server and the first application is a web application.

10. The computer-implemented method of claim 1, wherein the first computing device is a first client device and the first application is a browser application having wide-area network access.

11. A computing system, comprising:
one or more processors; and
memory including instructions that, upon execution by the one or more processors, cause the system to perform operations comprising:
receiving configuration data at a first computing device associated with a first operating system;
activating a first user interface component of a first programmatic module within a first application responsive to the receipt of the configuration data;
changing an appearance of the first application of the first computing device responsive to the activation of the first user interface component, the change of the appearance of the first application being without the first computing device changing a first executable file associated with the first application; and
generating a first programmatic response responsive to receiving a selection of the first user interface component of the first programmatic module of the first application, the first programmatic response including processing input/output, respectively, at the first computing device, the processing the input/output is associated with a graphical user interface.

12. The computing system of claim 11, wherein the operations further comprise activating or deactivating a programmatic module within the first application responsive to receipt of the configuration data.

13. The computing system of claim 11, wherein the operations further comprise deactivating the first user interface component of the first programmatic module within the first application.

14. The computing system of claim 11, wherein the first user interface component includes a text box that is enabled for selection, and wherein the receiving the selection of the first user interface component includes receiving a selection of the text box being presented on the graphical user interface, and wherein the first programmatic response to the receiving the selection includes processing values being communicated as input/output via the text box via the graphical user interface via the first computing device, and wherein the values include alphanumeric values.

15. The computing system of claim 11, wherein the operations further comprise:
validating a first input received by the first computing device based on the configuration data.

16. A non-transitory computer-readable storage medium including instructions that, upon execution by one or more processors of a computing system, cause the computing system to perform operations comprising:
receiving configuration data at a first computing device associated with a first operating system;
activating a first user interface component of a first programmatic module within a first application responsive to the receipt of the configuration data;
changing an appearance of the first application of the first computing device responsive to the activation of the first user interface component, the change of the appearance of the first application being without the first computing device changing a first executable file associated with the first application;

generating a first programmatic response responsive to receipt of a selection of the first user interface component of the first programmatic module of the first application, the first programmatic response including processing input/output, respectively, at the first computing device, the processing the input/output is associated with a graphical user interface.

17. The non-transitory computer-readable storage medium of claim 16, wherein the operations further comprise:

sending first login information from the first computing device; and receiving first privileged information at the first computing device responsive to the send of the first login information.

18. The non-transitory computer-readable storage medium of claim 16, wherein the operations further comprise:

requesting a first configuration data version status of the first application; and receiving the first configuration data version status of the first application.

19. The non-transitory computer-readable storage medium of claim 18, wherein the operations further comprise:

identifying the first configuration data version status of the first application is out-of-date; and requesting a second configuration data responsive to the identification of the first configuration data version status of the first application being out-of-date.

20. The non-transitory computer-readable storage medium of claim 16, wherein the first computing device is a web server and the first application is a web application.

* * * * *